United States Patent [19]

Moerman

[11] 4,020,440
[45] Apr. 26, 1977

[54] CONVERSION AND CONTROL OF ELECTRICAL ENERGY BY ELECTROMAGNETIC INDUCTION

[76] Inventor: Nathan A. Moerman, 7310 Maple Ave., Chevy Chase, Md. 20015

[22] Filed: Nov. 25, 1975

[21] Appl. No.: 635,007

[52] U.S. Cl. .............................. 336/155; 323/44 R; 336/172
[51] Int. Cl.² ......................................... H01F 21/08
[58] Field of Search .......... 336/155, 160, 165, 172, 336/229; 323/44 R, 56

[56] References Cited

UNITED STATES PATENTS

| | | | |
|---|---|---|---|
| 1,133,466 | 3/1915 | Gewecke et al. | 336/172 |
| 1,551,365 | 8/1925 | Burnham | 336/172 |
| 2,078,688 | 4/1937 | Sauer | 336/172 X |
| 2,491,345 | 12/1949 | Westendorp | 336/172 X |
| 3,735,305 | 5/1973 | Simnott et al. | 336/172 X |

Primary Examiner—Thomas J. Kozma
Attorney, Agent, or Firm—John G. Mannix; Thomas O. Maser

[57] ABSTRACT

In this pioneering invention, electrical energy in alternating or direct current form at any selected power, voltage, current, or frequency, within wide limits, is converted and controlled to other forms of electrical energy at uniformly and continuously controlled output waveform and voltage or current by means of progressive variation of magnetic flux in associated magnetic paths. For electrical energy regeneration, this invention relies on electromagnetic induction in windings surrounding variable permeance magnetic paths of ferrimagnetic or ferromagnetic materials. The controlling means rely upon progressive saturation and/or domain rotation for selected portions of the magnetic paths to yield a uniformly controllable permeance within the magnetic paths. Feedback techniques are used to stabilize the output and provide the means for external control of power output in combination with a reference source.

5 Claims, 16 Drawing Figures

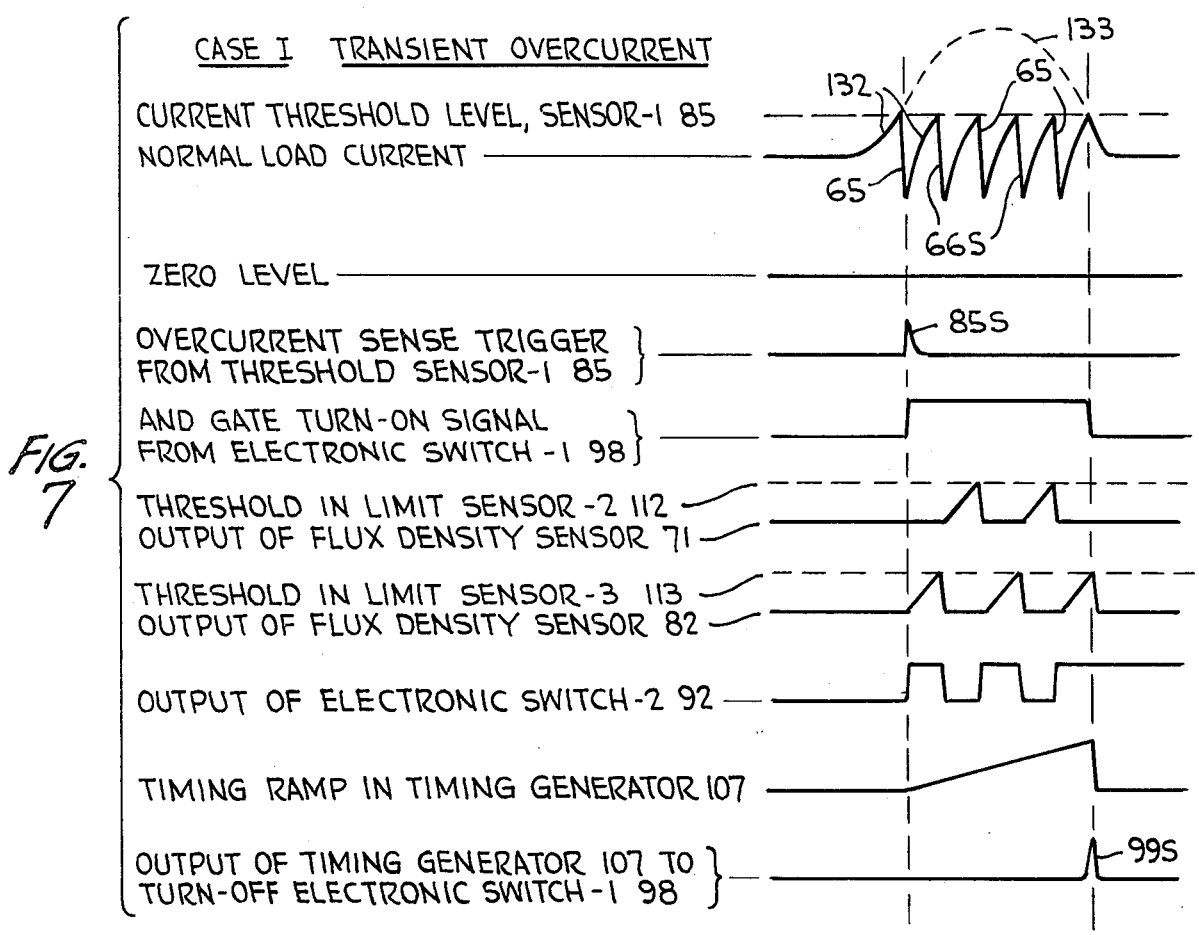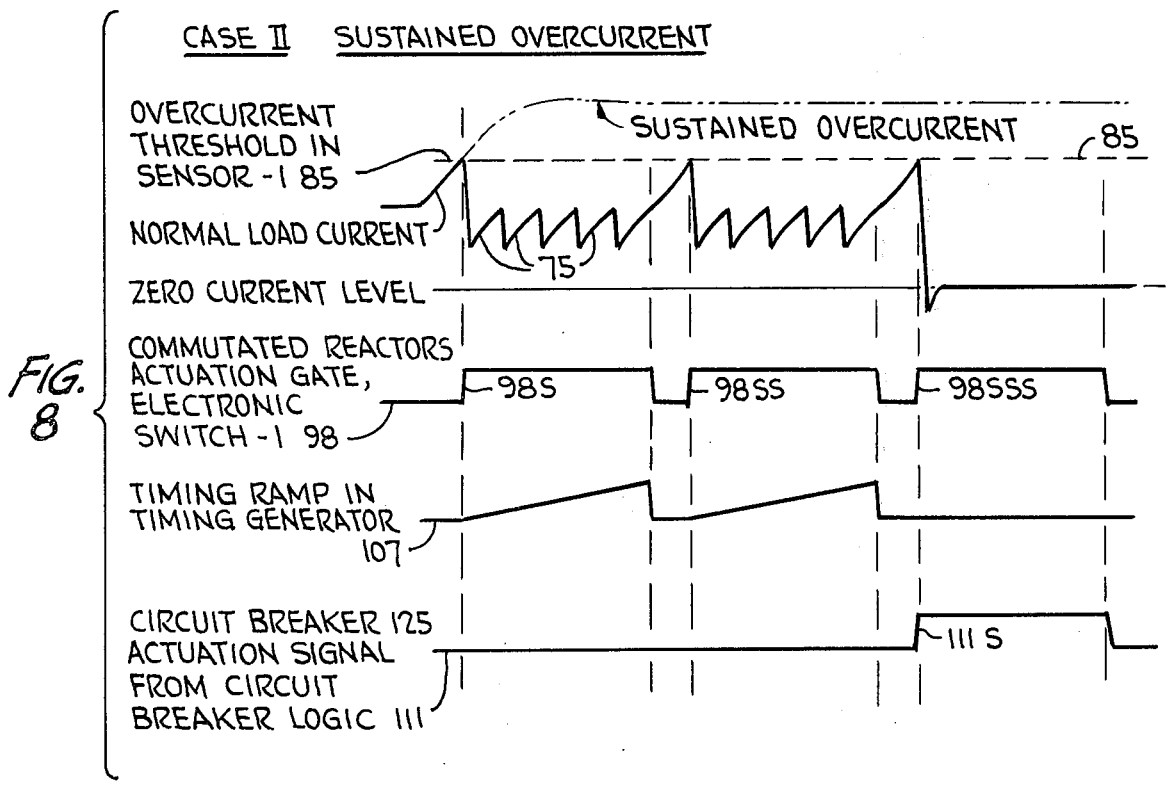

FIG. 12

DIRECT TO ALTERNATING CURRENT CONVERTER

EXTERNAL ALTERNATING CURRENT REFERENCE SIGNAL 244E APPLIED TO REFERENCE 244
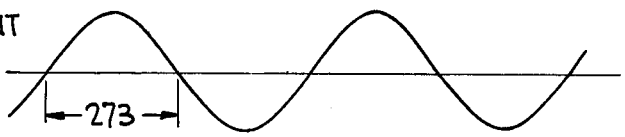

FULLWAVE REFERENCE 244F FROM REFERENCE 244 TO COMPARATORS 243 & 247 & CYCLING CONTROL 256
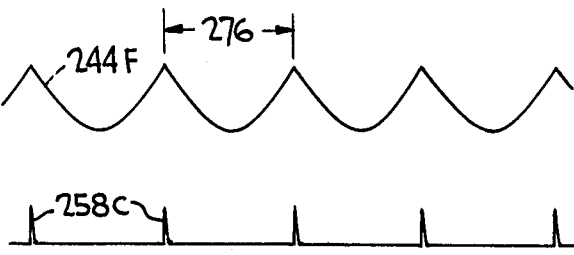

COMMUTATION SIGNAL 258C FROM CYCLING CONTROL 256.

FLUX DENSITY THRESHOLD LIMIT

MAGNETIC FLUX $\theta_2$ IN CORE 221
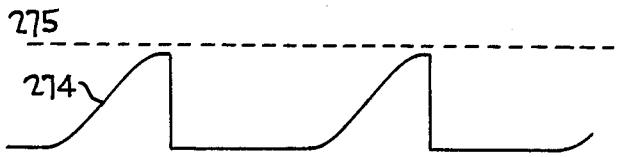

FLUX DENSITY THRESHOLD LIMIT

MAGNETIC FLUX $\theta_2$ IN CORE 221A
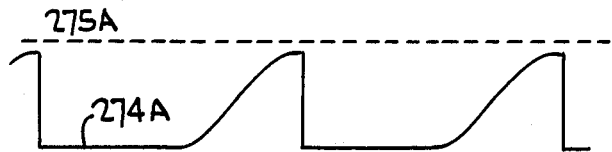

INDUCED VOLTAGE, WINDING 229

INDUCED VOLTAGE, WINDING 229A

OUTPUT ACROSS TERMINALS 235
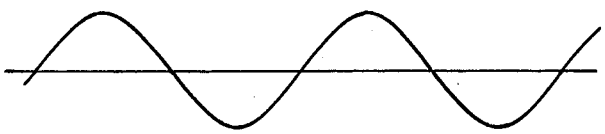

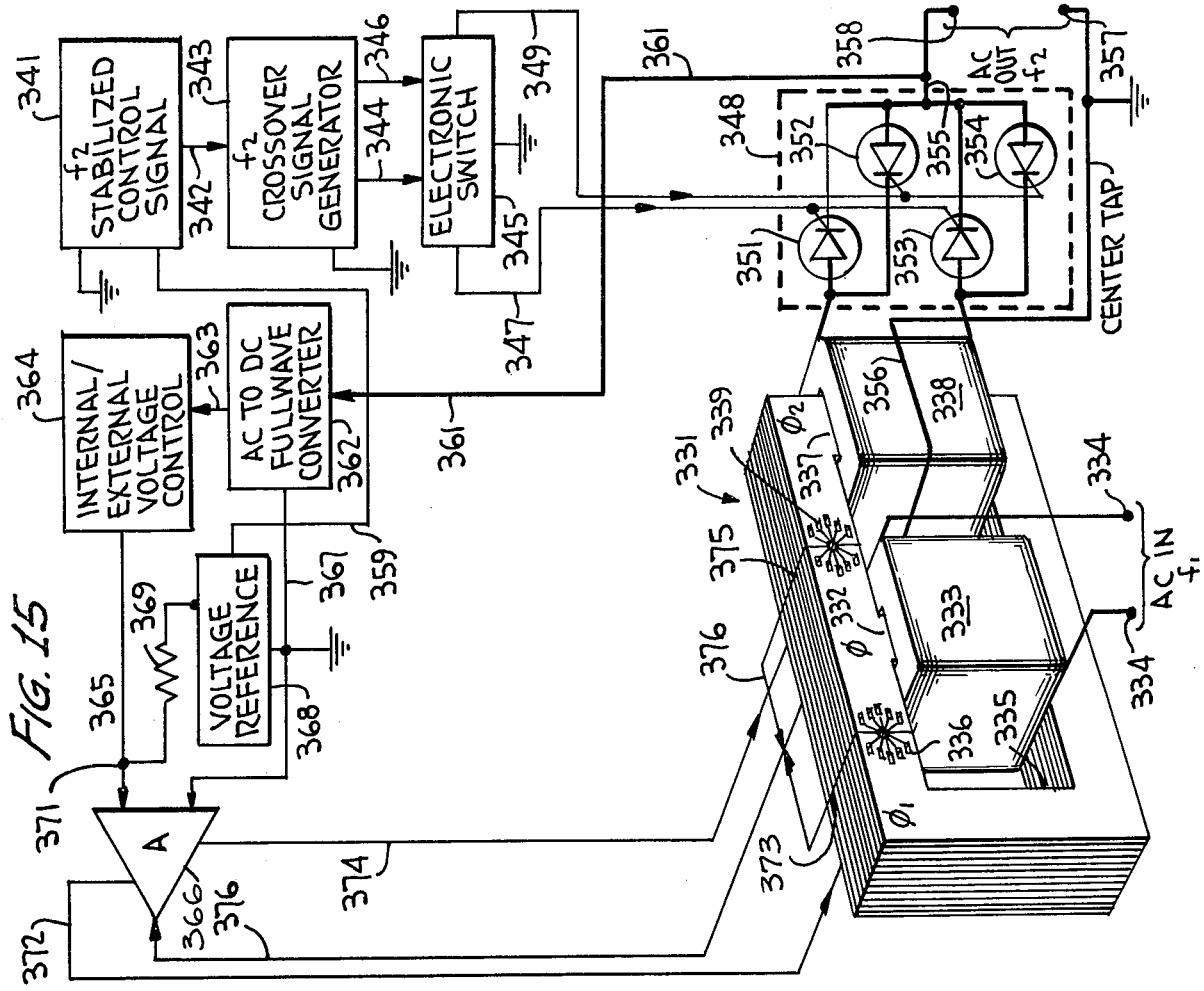

CONVERSION AND CONTROL OF ELECTRICAL ENERGY BY ELECTROMAGNETIC INDUCTION

GOVERNMENT USE

The invention described herein may be manufactured and used by or for the government of the United States of America for governmental purposes without the payment to me of any royalties thereon.

DESCRIPTION OF THE PRIOR ART

U.S. Pat. to Toffolo et al 3,087,108 issued Apr. 24, 1963 in Class 323–56, the most pertinent piror art known to this inventor, is lacking in the teachings of this invention. The instant invention provides a broad range of electrical control unrestricted by frequency, voltage or current. Structurally, the instant invention employs complementary feedback amplification with an associated reference source to produce a stabilized sinusoidal output waveform. Toffolo et al lacks the teachings of a fully implemented feedback control system including an inernal reference which would enable a full excursion of stabilized voltage and/or current and/or power control. Also, this invention utilizes interleaving as a coupling means whereas Toffolo et al uses abutments and air gaps. Other structural differences further preclude Toffolo et al as being anticipatory of this invention.

U.S. Pat. to Stimler 3,207,976 issued Sept. 21, 1965 in Class 323–56, the only other representative prior art known to this inventor, is also lacking in the teachings of this invention. Stimler is limited to small power applications such as in computers and in communication devices. My invention is directed to the full range of power applications and, accordingly, is structurally distinct.

No prior art teaches the control of magnetic flux in a continuous path in a uniform continuous proportional manner as set forth in this specification.

FIELD OF THE INVENTION

This invention is in the field of conversion and control of electrical energy by static magnetic means instead of by the conventional electronic switching or rotating machinery means. Included in the many applications of this invention is the effective management of the conversion, transmission, distribution, and utilization of elecrical energy.

SUMMARY

Control of magnetic flux in a closed magnetic path is accomplished by the progressive control of permeance in an assigned section of the path. Several configurations for continuous permeance control by progressive saturation and/or domain rotation are functionally described as:
  a. radial saturation and domain rotation
  b. transverse saturation
    1. multiple hole
    2. single hole, multiple lamination
    3. combination of single hole, multiple lamination with radial saturation
  c. transverse domain rotation A modifying characteristic for each of the above is obtained by a composite of magnetic materials with varying ratios of flux density to magnetomotive force combined with various structural configurations to achieve specific transfer characteristics.

Prior to the contributions of this invention, a technology for the total control of an electrical circuit by purely static magnetic means was not available. With the teachings of only the prior art incorporated therein, a single loop magnetic transformer core, for example, with some means for permeance control, a primary winding and secondary winding; control of energy is not realizable for energy applied to the alternating current primary winding and transferred to the secondary winding and its load. This is because the reduction of permeance in a single loop magnetic circuit causes and enhances an excessive and, most likely, an uncontrolled rise in core magnetizing current; this results from the reduction in counter electromotive force. This deficiency in the single loop magnetic circuit is removed by a balanced configuration wherein the magnetizing current in the primary circuit is maintained relatively constant by the imposition of the requirement that the sum of the flux in two controlled paths resulting from such balanced configuration substantially equals the relatively constant flux in the primary path for any operating condition. Windings of the permeance control sections in each of the paths are interconnected through external electronic complementary drive apportioning amplifiers to achieve this objective.

In an alternating current power controller, the center leg of a three legged magnetic structure is assigned to the alternating current primary circuit. The outer legs obtain alternating current produced flux through associated permeance control sections controlled in a complementary circuit configuration such that the primary magnetizing current is essentially unchanged as the flux is transferred from one outer leg to the other. A single output winding on either of the outer legs will supply a controlled change in output voltage or current by means of an open loop or feedback amplifier control. Output windings on both outer legs will supply complementary output voltages as the permeance control sections are driven through their total excursions. Feedback circuit configurations enable control of constant voltage or constant current for alternating or direct current loads.

In a direct to direct current power converter, two identical permeance controlled direct current power pulse trnsformers are alternately switched, in a predetermined time sequence, to subdivide the input direct current power into a stream of direct current power pulses. Each of these power pulses is modified, through the controlled electromagnetic induction in the output winding of the pulse transformers to derive the desired output voltage or current. Continuous direct current power is reconstituted by combining the outputs of the two transformers. The transformation ratio between input and output and output is primarily a function of the primary and secondary turns ratio as in standard transformers. The output is further modified and stabilized by the activated permeance control in a feedback system. Control flexibility, afforded by the feedback system, enables not only stabilized output amplitude control but also direct current pulse waveforms of variable characteristics.

The commutated magnetic paths as used in the direct to direct current converter can be configured as commutated reactors which, when placed in a direct current circuit, can be used to control current amplitude in the event of overload, short circuit, or during switching operations.

In a direct to alternating current power converter two identical permeance controlled direct current power pulse transformers are alternately switched in a time sequence controlled by the zero crossover points of the input reference alternating current waveform. In this way, the direct current power input is subdivided into consecutive power pulses that are modified within the direct current power pulse transformers, under control of the input alternating current reference signal and feedback system, into the desired waveform, typically sinewave. The addition of a closed loop feedback system stabilizes the output and enables control of amplitude through internal or external means. The combined outputs of the two transformers, connected in phase opposition, produce a continuous alternating current power waveform.

In the conversion from a high frequency power source to a low frequency output, the alternating current controller, as described previously, is supplied the high frequency power as its input and the output is amplitude modulated by the low frequency control signal through the electromagnetic induction controlling means. The totally modulated output envelope is rectified to produce the positive and negative lobes, respectively, of the low frequency power waveform.

In an alternating to direct current power converter, two identical permeance controlled direct current power pulse transformers are alternately switched in a time sequence determined by the zero crossover points of the input alternating current waveform. Alternate positive and negative lobes of the input alternating current power are distributed between the transformers by this means for modification within the permeance controlled transformer into a near direct current square waveform at the output. A feedback system through the permanence control means continually adjusts the electromagnetic induction in the output winding to produce the near square waveform. Combined outputs of the two power pulse transformers in series aiding connection produces a continuous direct current power output with slight depressions marking the switching transition periods, in contrast with the large magnitude of low frequency ripple power resulting from conventional alternating to direct current converters.

This invention is directed to magnetic circuit means for conversion and control of electrical energy from power sources. For the first time, megawatts of electrical energy can be controlled and/or converted without moving mechanical elements and without voltage or current limited circuit control elements. Among the many features of this invention is the design freedom to couple electrical energy from any alternating or direct current source at a wide range of voltage, current, or frequency of alternations, such as from a high speed alternator, high constant current direct current source, of a high voltage low current source. Also, this invention provides the means for a universal electrical energy conversion system for coupling into existing power networks from sources such as magnetohydrodynamic generators, electro fluiddynamic generators, fuel cells, solar cells, thermoelectric generators, thermionic generators, and the projected thermonuclear fusion direct conversion electrical generators.

The external electronic control capability of these electronic power conversion devices enables programmed momentary suppression of power output to aid the normally difficult circuit breaker operations. Electronic control of reactive current devices permit power factor correction and suppression of voltage surges in high voltage transmission circuits.

In bulk electric power generation and transmission, a basic design of square wave alternator can serve as the electrical power source for both sinewave alternating curent and direct current power transmission, through the intermediary of the conversion means described in this invention.

Thus, this invention provides the component means for an effective high power, high voltage transmission system including the coupling converter from the power generating source to the transmission line and the branching terminal converters followed by distribution conversion and control subsystems. The inherent external electronic control afforded by this invention enables computer control of a power system network. This invention also provides a means for limiting direct current in high power direct current circuits during overload or short circuit, and provides a means for direct current switching, heretofore a difficult task.

In summation, this invention provides a means for controlled electromagnetic induction to achieve electrical power control in contrast to the prior art involving elements operating in the electric circuit, with current and voltage limitations and fixed forward voltage drops, such as mercury-arc rectifiers, silicon controlled rectifiers, etc. This invention offers for the first time a universal capability for the transformation of electrical energy; direct to direct current, direct to alternating current, alternating to direct current, alternating to alternating current, and frequency to frequency; all without moving mechanical parts.

It is, therefore, an object of this invention to provide electrical power control by controlled electromagnetic induction.

Another object of this invention is to provide a universal capability for transformation of electrical energy.

A further object of this invention is to provide a controlled electromagnetic induction means for controlling alternating current power.

A still further object of this invention is to provide controlled electromagnetic induction means for direct to direct current power conversion and control.

Still another object of this invention is to provide a controlled electromagnetic induction means for direct to alternating current power conversion and control.

Another object of this invention is to provide a controlled electromagnetic induction means for alternating to direct current power conversion and control.

Still another object of this invention is to provide a controlled electromagnetic induction means for alternating current power frequency conversion and control.

A still further object of this invention is the elimination of moving parts and electrical controlling elements which have current and/or voltage limitations and fixed forward voltage drops.

Another object of this invention is for the control of power in an open or closed loop process control.

Still another object of this invention is to generate, by static means, polyphase alternating current power from direct or alternating current power at any frequency.

A further object of this invention is the coupling to direct current sources and conversion to a power form for end utilization.

Still another object of this invention is the coupling of electric power from one operating level of voltage or current to another level.

Another object of this invention is to reduce size and weight of electrical conversion and control structures by the generation, conversion and control of high frequency electrical power.

A still further object of this invention is to provide an electric power control means responsive to a sensed physical state, such as: voltage, current, power, temperature, pressure, strain, humidity, acidity, or the like.

An object of this invention is to convert constant current power sources to other forms of electrical energy.

Another object of this invention is to provide control of electrical power by electronic control of magnetic means in static configurations.

Still another object of this invention is the reduction or elimination of arcing at direct current power switches.

Yet another object of this invention is to provide switching of electrical circuitry without the use of mechanical switches.

An object of this invention is the control of current in direct current circuits by commutated reactors with minimum power loss in the control means.

Another object of this invention is the uniform control of inductive reactance of a power reactor in an electric circuit.

A further object of this invention is to provide an alternating current power controller with feedback from a rectified direct current output therefrom wherein either sensed voltage or current at predetermined threshold levels enable automatic crossover from between constant voltage and constant current control.

A still further object of this invention is the control of electrical pulses to a process control.

Another object of this invention is to provide static magnetic means for amplifying electric power.

A further object of this invention is to provide automatic power factor adjustment.

An object of this invention is to provide the means for the computer control of power subsystems in an electric power network.

Another object of this invention is to provide means for power waveform generation of arbitrary shape or step function.

Still another object of this invention is to provide means for control of voltage, current, and phase of a power subsystem of an electrical power network.

A further object of this invention is to provide means for the suppression of and the protection from power surges, transmission line fault, and transient phenomena.

The exact nature of this invention as well as other objects and advantages thereof will be readily apparent from consideration of the following specification relating to the annexed drawings in which:

BRIEF DESCRIPTION OF THE DRAWINGS

FIG. 7 is a time sequence chart for the operation of the reactors of FIG. 6 during a transient overcurrent, FIG. 8 is a time sequence chart for the operation of the reactors of FIG. 6 during a sustained overcurrent, FIG. 12 is a time sequence chart for the operation of the converter of FIG. 11, FIG. 14 is a time sequence chart for the operation of the converter of FIG. 13, FIG. 15 shows an alternating current power frequency converter and FIG. 16 is a time sequence chart for the operation of the converter of FIG. 15.

DESCRIPTION OF A PREFERRED EMBODIMENT

Figure 1:
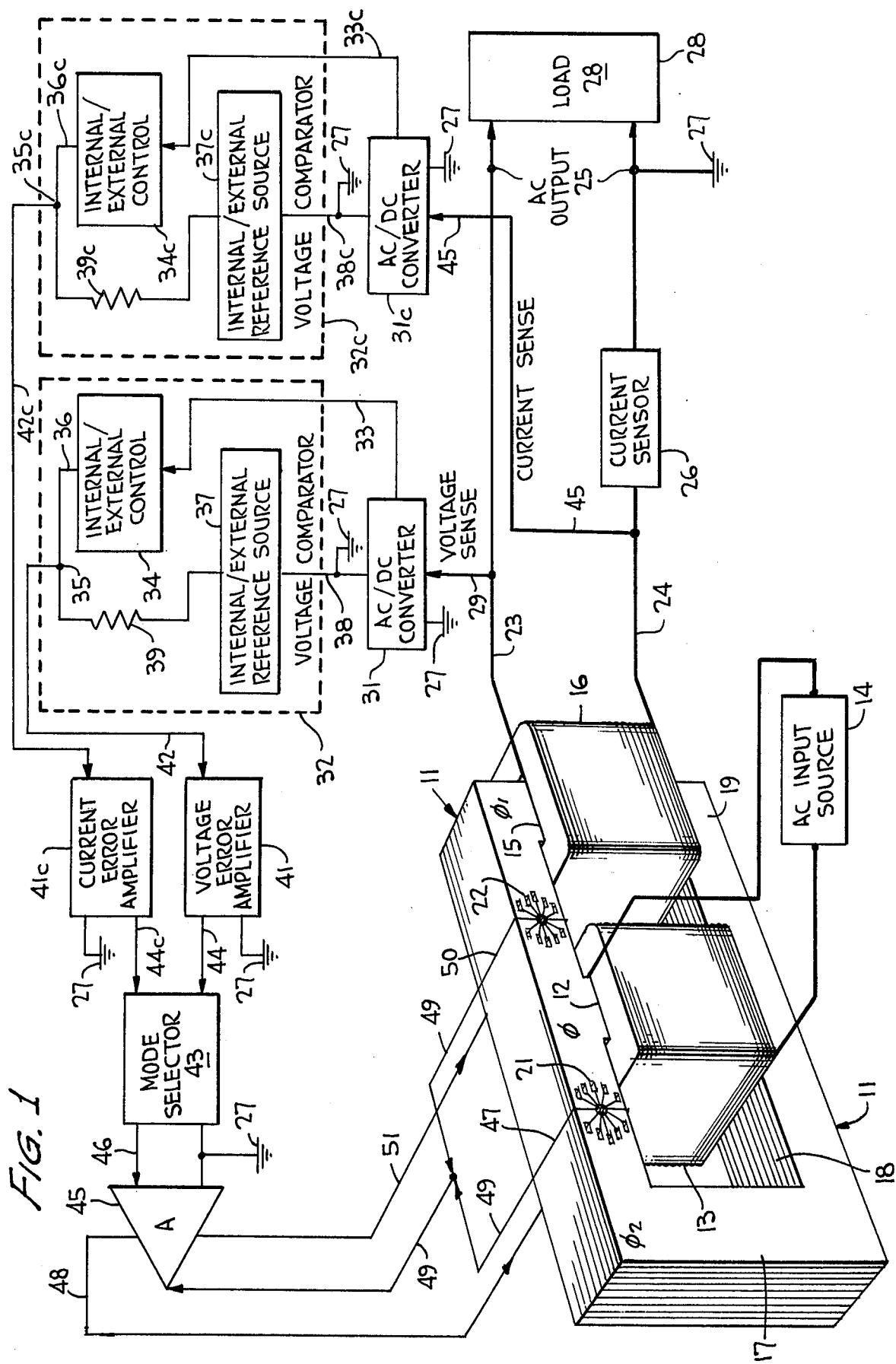
FIG. 1 shows an alternating current power control means.

Turning now to the drawings, FIG. 1 shows an alternating current power controlling device incorporating the elements of this invention. The shell type magnetic core 11 is configured so as to have an input leg 12 with input winding 13 therearound. The input current connected to input winding 13 is from alternating current source 14. Output leg 15 of core 22 has an output winding 16 thereon. A flux bypass leg 17 is magnetically integral with a first return section 18 coupling said bypass leg 17 to input leg 12. A second return leg 19 couples said input leg 12 to said output leg 15. A first permeance control section 21 is coupled to complete the magnetic circuit through input leg 12, first permeance control section 21, bypass 17 and first return section 18. A second permeance control section 22 is coupled to complete the magnetic circuit through input leg 12, second permeance control 22, output leg 13 and second return section 19 back to input leg 12.

Output winding 16 has two ouput leads 23 and 24, respectively. The alternating current power output terminals 25 have connected output lead 23 to one of terminals 25 and a current sensing device 26 connected between output lead 24 and the other of the terminals 25. The said other terminal 25 is also connected to a common return 27. A load 28 is connected across the power output terminals 25. A voltage sense lead 29 is connected between output lead 23 and an alternating to direct current converter 31. From common return 27 in a voltage comparison device 32, a bridge in this example, the feedback voltage provided from converter 31 in direct current form is connected through the lead 33 to an internal or an external voltage control 34, the output of which is connected to a junction 35 through a lead 36. Also from common return 27 in bridge 32, an internal or external reference source 37 is connected by a lead 38. Between bridge output junction 35 and reference source 37 is connected a fixed resistor 39. A voltage error signal amplifier 41 is connectd to bridge output terminal 35 by a lead 42. The output of error amplifier 41 is connected to a mode selector 43 through a lead 44.

Between output winding 16 and current sensor 26, a current sense lead 45 connects to duplicate structure identical with that of the voltage control section just described with the exception of the specific component values. Since the feedback levels in the current sensing section are far lower than that in the voltage sensing section, the components are designed accordingly. As far as the mode selector 43 is concerned, the input voltages thereto are substantially in the same range or excursion. The output of the mode selector 43 is connected as the input to a complementary apportioning feedback amplifier 45 through a lead 46. The amplifier 45, mode selector 43, and the error amplifiers are connected to the common return 27. Winding 47 of permeance control section 21 is connected to the output of the amplifier 45 through lead 48 and return 49. Winding 50 of permeance control section 22 is connected as the other output of amplifier 45 through lead 41 and return 49.

Amplifier 45 is a direct coupled, complementary output amplifier. That is, the outputs of the amplifier drive the permeance control sections 21 and 22 in inverse relationship. When the energizing current in one permeance control section is at a maximum value, the energizing current for the other permeance control section is at a minimum value. When one is at 25 percent of its maximum, the other is at 75 percent of its maximum. These conditions may assume any intermediate values, including complete reversal from the original state, and remain in inverse relationship at all times.

Figure 2:
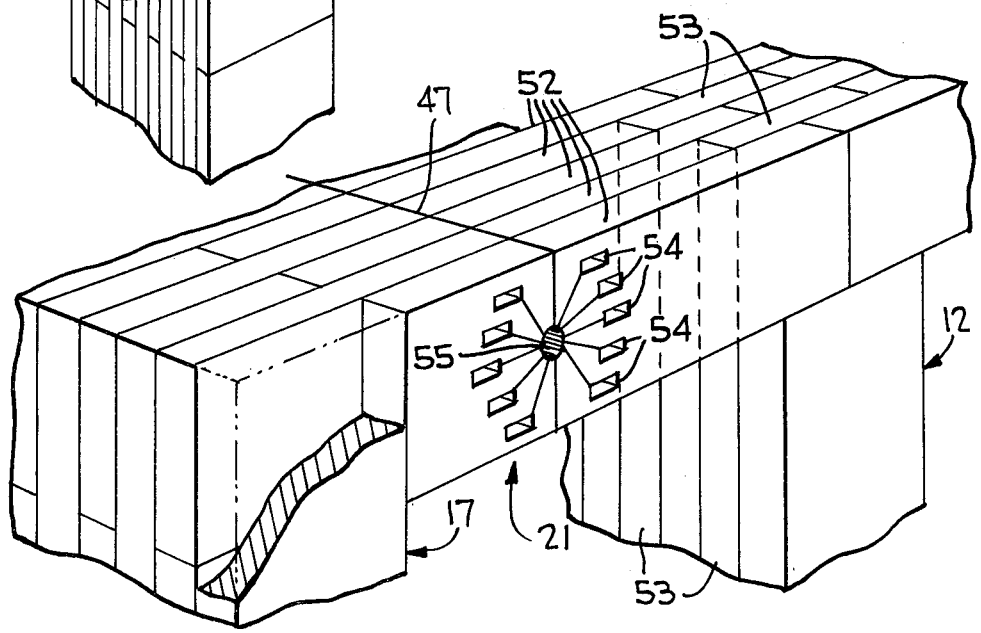
FIG. 2 shows details of a radial saturation and domain rotation permeance control section.

FIG. 2 shows the details of a radial saturation and domain rotation permeance control section 21. The permeance control section 21 is interleaved into the structure between legs 12 and 17, for example. The different lamina of leg 12 can have alternate layers extend to the exterior surface as shown by lamina 53. The interleaving increases the net permeance at the junctions of separate elements considerably greater than the mere abutment of path elements. Obviously, many designs of the interleaving and/or abutments of the sections into the main magnetic paths are possible within the teachings of this invention.

Each of the elements 52 has a plurality of winding holes 54 which are concentrically disposed about a central hole 55 and include the outer surfaces of the section. Winding 47 is toroidally wound through the central hole and the concentrically disposed holes to form a segmented toroidal winding. Holes 54 are configured to be narrow in the direction of the magnetic path so as to minimize the net cross section reduction in the region of the permeance control section. This provides a sufficient magnetic path while providing control. The control winding includes the segmented toroidal wires stated above with winding segments that surround the outer surface of the section, resulting in a near toroidal configuration.

A uniformly varying excitation current applied to the winding of the permeance control section yields a progressive, continuous variation of the permeance across the control section. This results from the varying radial saturation about the center hole of the toroid. The saturation of the toroidal section expands radially as the excitation current is increased. The net effect of this control element on the permeance of the path is a combined function of radial saturation, as described, plus a component of domain rotation produced by that component of the toroidal flux which is transverse to the main flux path. This transverse component results from the circular distribution of magnetic domains. The plurality of holes disposed about the center hole in a circular form with the outer edges of the control section being on the circumference of such circular form results in the near circular control flux about the center hole. The transfer characteristic between the excitation current and the permeance of the main magnetic path can be altered as desired by structural and magnetic property variation of the magnetic materials, either in a homogenious structure of a composite structure. Interleaving and/or abutments serve to provide low reluctance coupling within the main magnetic path. These last two sentences apply also to the species of FIGS. 3, 4, and 5.

OPERATION OF THE EMBODIMENT IN FIG. 1

The operation of the alternating current power control means of FIG. 1 is achieved, basically, by the controlled transfer of alternating current power between an input source and an output circuit through a variable permeance magnetic circuit. This is achieved by means of flux apportioning between an output path and a bypass path, under feedback control including a reference source.

The alternating current power controlled in FIG. 1 is capable of providing a stabilized, adjustable output voltage level over a wide range of voltage levels. It is also capable of providing the stabilization of a selected output voltage under varying input and output conditions, such as source or load fluctuations. The controller is further capable of controlling output power on an adjustable constant current basis. Additionally, where a direct current load is derived from the output of the alternating current controller, stabilization of the direct current load can be made therefrom. Among the many uses of this controller are the open or closed loop servo control applications.

To accomplish the several functions of this new controller, the voltage of the output winding 16 is sensed by lead 29 and directed to the alternating to direct current converter 31 for conversion into a direct current level representative of the output voltage. This direct current level is applied as the input to the feedback input portion of the voltage comparator bridge 32 and serves to stabilize the output voltage against input power and load variations. The feedback voltage is compared against the reference voltage generated by reference source 37 to derive an error signal at junction 35 through the network including fixed resistor 39 and the variable element in the internal or external voltage control 34. In the operation of the control 34, the control may be in the form of a variable resistor of any adequate means of varying the current in the bridge by local or remote means. In the external operation, the control may be the same means as for internal operation, except for the addition of a sensing device with means of operating the variable control 34, said sensing device being included in the feedback configuration.

An additional control point in the feedback circuit is provided by the reference source 37, either internal or external. An external reference may be of several forms such as a low frequency waveform for output modulation or a step change in voltage to change the scale of the voltage or current control 34.

The output of the bridge 32 is applied as the input to the voltage error signal amplifier 41 which amplifies the error signal to a level sufficient to initiate the operation of the mode selector 43. Also supplied as an input to the mode selector 43 is an error signal from current sensing circuitry including current sensor 26, lead 45, alternating to direct current converter 31C, voltage comparator 32C, and current error amplifier 41C. The voltage level in lead 45 is the voltage drop across current sensor 26 representing the current in the load circuit. The voltage control 34 and the current control 34C establish a boundary condition within which the alternating current power controller of FIG. 1 will operate. The boundary voltage can be, for example, 100 volts and the boundary current can be set at 10 amperes, again for example. This means that the load can be operated at any combination of values within these boundaries under stable conditions.

The mode selector 43 selects either the amplified voltage error signal or the amplified current error signal depending upon the condition at the load. The circuitry within mode selector 43 compares the amplitudes of the amplified error signals and selects the higher of the two to determine the operation mode to which the alternating current power control will respond, as required by load circuit conditions. To continue the above example, if a constant 100 volt output from winding 16 is selected, a spurious rise of current will be limited to the selected 10 amperes. A load condition that would exceed 10 amperes causes the mode selector to select the constant current mode, thus allowing the voltage to fall to maintain the preset current limit.

The output of the mode selector 43 is applied as the input to the apportioning amplifier 45. The input section of the amplifier 45 is a phase inverter which drives the complementary output power stages to feed the permeance control elements 21 and 22. The apportioning of current through the permeance control elements inversely apportions the flux between the load path and the bypass path to adjust the output energy in the load circuit in response to the feedback signal.

A modification of FIG. 1 would be a polyphase power system which could be satisfied by equipping each phase independently as in FIG. 1. With common return as in a wye configuration connection, for example, output windings are then connected to a three phase line or load.

A further modification of FIG. 1, whereby a winding on the bypass leg is treated as a second output, achieves a complementary power output configuration useful for balanced or fixed loads. This configuration will find general application in closed loop servo control systems where the complementary power output is used to drive servo bi-directional motors or other process control elements. A unique application is in power factor correction for alternating current power system. The error signal in this case, is defined by the leading or lagging phase angle of alternating current with respect to line voltage. Two two output windings are connected, respectively, to an inductor and a capacitor. Leading or lagging current is diminished by the reflected inductive or capacitive load, respectively, through the input winding.

A direct current load can be supplied by this embodiment through the addition of an alternating to direct current converter between the output winding leads 23 and 24 and the junction for lead 29. In this case, the alternating to direct current converters 31 and 31C can be bypassed since the sensed signals are already in direct current form.

To achieve the operational characteristics as described, the maximum mutual coupling between input and output windings is accordingly compromised in system tradeoffs. The resulting increase in leakage reactance is minimized by design optimization.

A basic principle evolves from this invention wherein the electromagnetic induction in the output winding of a transformer-like structure is made dependent upon the time rate of change of magnetic flux amplitude which is controlled by external means in relation to a reference source and a controlled output set point in a stabilizing feedback system. With this capability, a source of electric power can be controlled at the load terminals in response to a sensed physical parameter related to the load, and not be restricted by voltage, current, or power levels required by the load. A further extension of the power control capability inherent in this invention is provided by computer program or other form of decision element applied to a single power source and load or a power network configuration.

In the control and stabilization of alternating current power over the full excursion of voltage and current within preestablished limits, a means is required to uniformly vary the voltage or current at a load with respect to a stabilizing reference voltage. This invention satisfies this requirement through the implementation of a variable permeance transformer-like structure, which is controlled by a feedback circuit containing a reference voltage source and means for external or internal voltage and current limit adjustments.

PERMEANCE CONTROL SECTION IN FIG. 3

Figure 3:
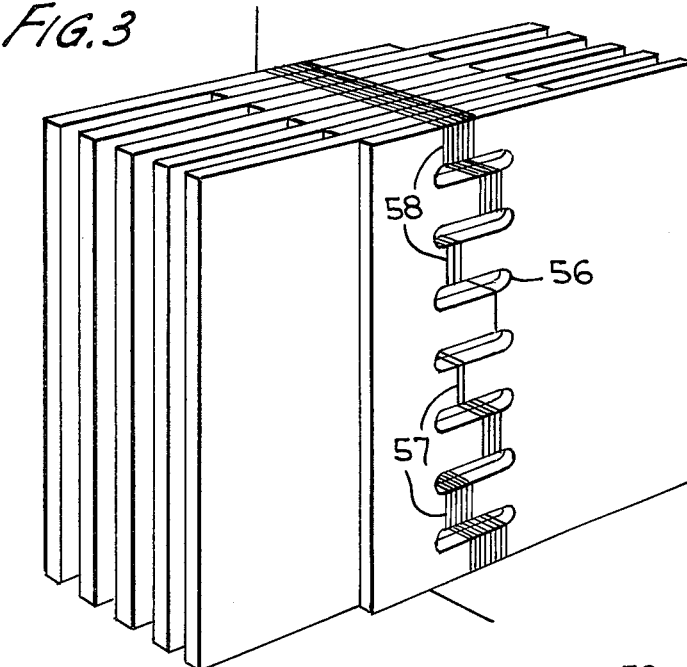
FIG. 3 shows details of a multiple hole transverse saturation permeance control section.

FIG. 3 shows the multiple hole or slot transverse saturation permeance control section modification. A plurality of transverse slots are provided for the windings of the control section. Each slot has its longest dimension parallel to the main flux path and is disposed one above the other between the edges of the control section. The central slot 56 is located midway between the edges of the control section and the remainder are disposed so that adjacent slots are equidistant from each other and the outer slots are the same distance from the edges of the control section as the adjacent slots are from each other along a transverse path. The windings 57 below the central slot are reverse wound with respect to the windings 58 above said central slot to produce a rotating, reinforcing flux and also cancel main path flux induction. There is a graduated symmetrical number of winding turns, serially connected, from the center slot to the outer slot but the total number of turns above the center slot equals the total number of turns below the center slot. That portion of the control section with the greatest number of turns will be saturated ahead of the other portions. The other portions will saturate progressively in direct relationship to the number of turns. The location of the largest and smallest number of turns can, obviously, be reversed. Also, the largest number can be at one edge of the section with a progressive lessening of the number of windings to have the smallest number of windings at the other edge of the section. A uniform increase in excitation current applied to the winding terminals produces a progressive reduction in permeance of the magnetic path in which the control section is inserted.

PERMEANCE CONTROL SECTION IN FIG. 4

Figure 4:
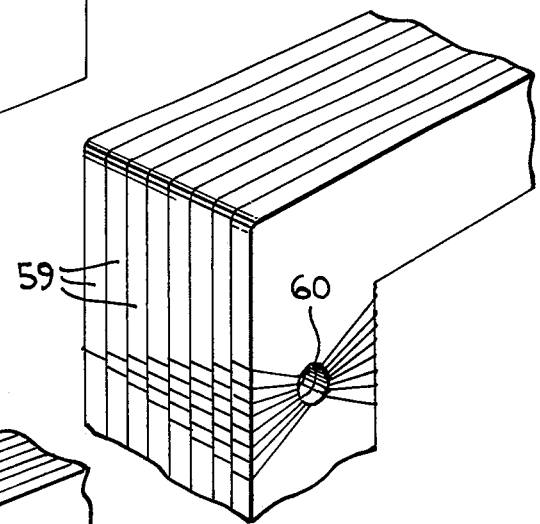
FIG. 4 shows details of a single hole multiple lamination transverse saturation permeance control section.

FIG. 4 shows a single hole, multiple lamination transverse saturation permeance control section modification. The smallest number of windings 59 is on an outer lamination and the successive lamination windings have progressively increasing number of turns resulting in the largest number of windings on the other outer lamination. An acceptable variation would be to have the maximum number of windings at the edges of the section and the minimum on the center lamination, or the reverse thereof. From maximum to minimum, the number of windings is progressively distributed among the lamina comprising the section.

Each of the windings is connected in series with the adjacent windings and phased so as to produce a direction of flux flow about the center hole 60 that is the same for adjacent laminations. The technique for producing these windings and preserving the close spacing between the laminations will borrow heavily from printed and deposited circuit technology. When energizing current is applied, that lamination with the largest number of windings will saturate first in the region between the center hole 60 and the outer edges of the section. The other laminations will saturate in like manner in a sequence directly related to the number of associated winding turns. Hole 60 is centered in the permeance control section and windings are wound as a partial toroid with an equal number of turns on each side of the control section with respect to such hole 60. It is to be noted that the radial saturation control of FIG. 2 can be a modification to the stratified saturation control of FIG. 4 to provide a finer degree of progressive permeance control.

PERMEANCE CONTROL IN FIG. 5

Figure 5:
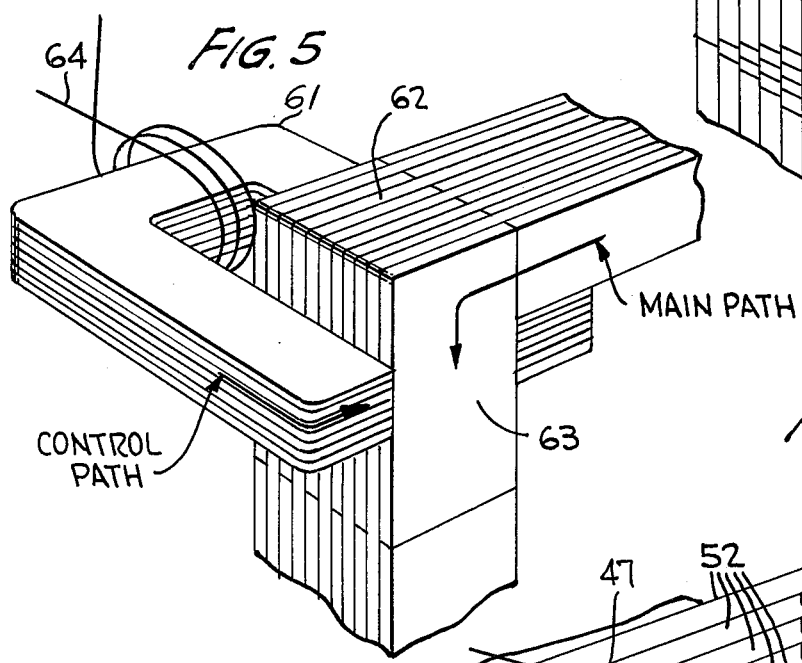
FIG. 5 shows details of a tranverse domain rotation permeance control section.

FIG. 5 shows a transverse domain rotation permeance control modification. The control element 61 is a closed loop toroidal structure, a portion of which is coupled into the main flux path 62 by interleaving or abutment. That section of the control element between the interleaving is the permeance control section 63 which will be subject to an orthogonal flux generated by currents in a control winding 64. The magnetic domains in the control section 63 are progressively rotated in proportion to the magnitude of the control current passing through winding 64, resulting thereby, in a reduction of permeance in the main flux path.

DESCRIPTION OF THE COMMUTATED REACTORS OF FIG. 6

Figure 6:
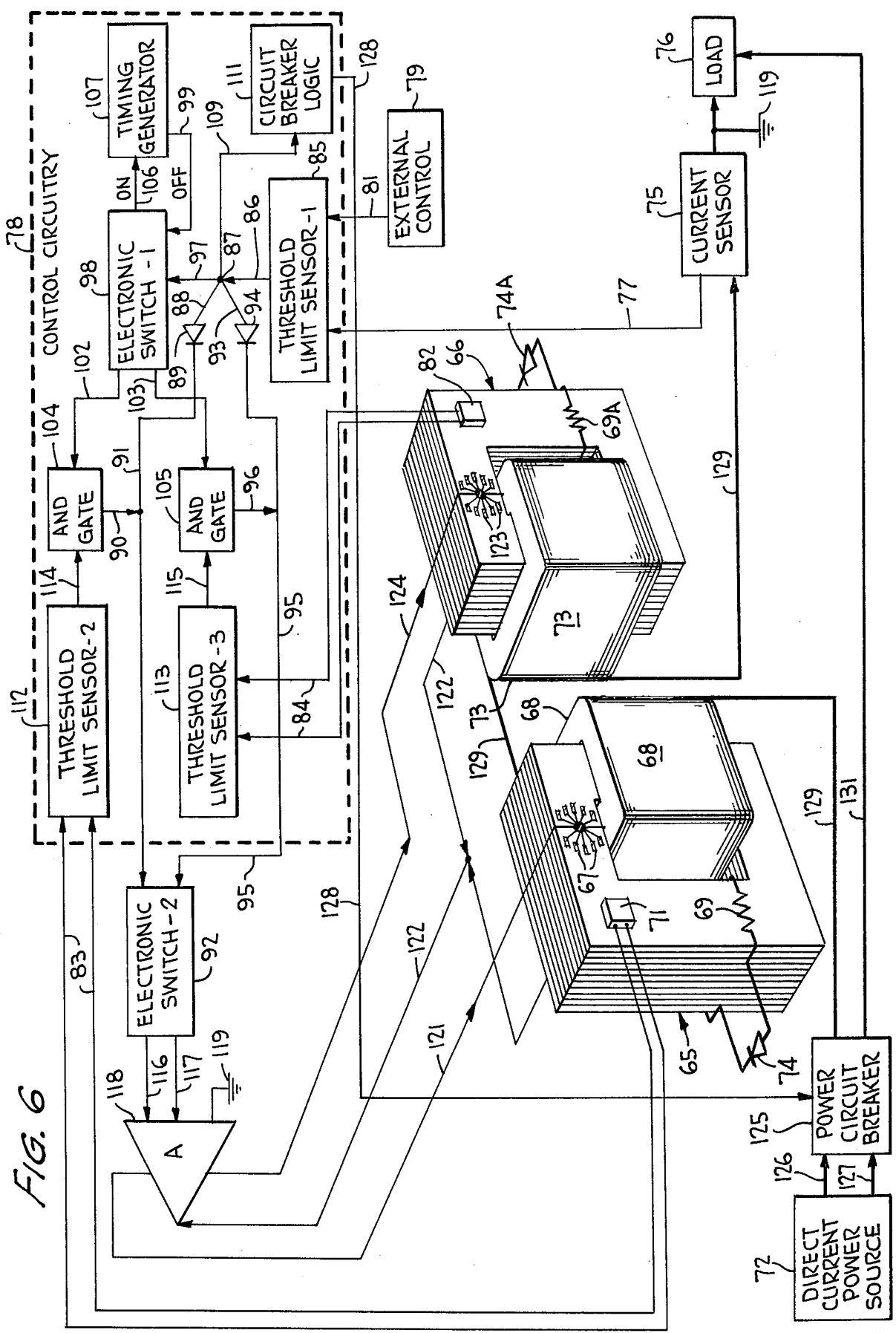
FIG. 6 shows a device for controlling current utilizing commutated reactors.

FIG. 6 shows a pair of commutated inductive reactors in a direct current power curcuit. At high current levels, these reactors, when activated, generate an average counter electromotive force which opposes the direct current voltage source. This counter electromotive force limits the current in the direct current power circuit as may be required during an overload, a short circuit condition, or a desired switching operation. A simple derivative of this embodiment for alternating current power systems is evident.

The commutated inductive reactors 65 and 66 are identical in structure and operational capabilities. Referring to reactor 65 for purposes of explanation, the structure constitutes a closed magnetic path including a permeance control section 67 and a reactor winding 68, a reverse transient suppressor winding 69 and a flux density sensor 71. One lead 129 of the reactor winding 68 is connected to the power source 72 through power current breaker 125 and lead 126. The other lead of the reactor winding 68 is connected to a terminal of the companion reactor winding 73 of reactor 66, with the other lead of reactor winding 73 connected to the power circuit so as to connect the two reactor windings in series with the power circuit. A rectifier 74 is connected in the reverse transient suppressor winding 69 to conduct for the reverse voltage induced during the collapse of the field in the magnetic path. A flux density sensor 71 is joined to the magnetic core. The flux density sensor may be a Hall effect device or other flux density transducer. A current sensing resistive element 75 is connected between the reactors and a load 76.

A lead 77 connects current sensor 75 to a control circuit 78. An external control 79 can be supplied to control 78 through a lead 81. Also, as inputs to control 78 are the two flux density sensors 71 and 82, the latter being on reactor 66, through lead pairs 83 and 84, respectively Within the control circuitry 78, the output of the current sensor 75 through lead 77 is applied as an input to threshold limit sensor-1 85 to which also is applied as an input the output of external control 79 through lead 81. The output of threshold limit sensor-1 85 is applied through lead 86 to a junction 87. A first lead 88 with a diode 89 is connected between junction 87 and a first input lead 91 to electronic switch-2 92. A second lead 93 with a diode 94 is connected between junction 87 and a second input lead 95 to electronic switch-2 92. Diodes 89 and 94 are oriented to couple the two inputs to electronic switch-2 from a single signal source, junction 87. A third lead 97 from junction 87 is connected to be the turn-on lead to electronic switch-1 98. A second input lead 99 to electronic switch-1 98 is connected to be the turn-off lead thereto. A first output lead 102 from electronic switch-1 98 is connected as the input to AND gate 104. A second output lead 103 from electronic switch-1 98 is connected as the input lead to AND gate 105. A third output 106 from electronic switch-1 98 is connected to a timing generator 107 which has for its output the turn-off lead 99 to electronic switch-1 98. A fourth lead 109 from junction 87 is connected as the input to circuit breaker logic curcuit 111.

Output lead pair 83 from flux density sensor 71 is connected as the input to a threshold limit sensor-2 112 and the output lead pair 84 from flux density sensor 82 is connected as the input to a threshold limit sensor-3 113. The output of threshold limit sensor-2 is connected through lead 114 as a second input to AND gate 104 and the output of threshold limit sensor-3 is connected through lead 115 as a second input to AND gate 105. Lead 90 is connected to lead 91 as the output lead of AND gate 104. Lead 96 is connected as the output lead of AND gate 105 to lead 95. Output leads 116 and 117 from electronic switch-2 92 are connected as the inputs to the power amplifier 118. A common 119 provides the common return for the control signals. The output of electronic switch-2 92 conducted through lead 116 enables the amplifier 118 to energize permeance control section 67 through a lead 121 and return by lead 122. Lead 117 conducts the enabling signal for the amplifier 118 to provide the energizing current to permeance control section 123 in reactor 66 through a lead 124 and return by the common return 122.

In the power circuit between the direct current power source 72 and the first reactor winding 68 is connected a power circuit breaker 125. Two power leads 126 and 127 connect power source 72 to power circuit breaker 125. Also connected to power circuit breaker 125 is a lead 128 which is connected as the output of the circuit breaker logic circuit 111. The power circuit breaker 125 is connected to the first reactor winding 68 through lead 129 and is connected to the return side of the power circuit through lead 131.

Within the power circuit breaker 125 is provided a third, specially modified reactor having its reactor winding connected in series with the other two reactor windings in the power circuit and having its permeance control section connected to receive an energizing signal from the circuit breaker logic circuit 111 until de-energization is enabled by the logic circuit 111. The third reactor is modified to contain a built-in source of magnetomotive force which, when the reactor permeance is abruptly increased, produces an induced voltage in the reactor winding that opposes the direct current line voltage. This third reactor is then used to momentarily reduce the current in the power circuit to zero during switching of circuit breaker operations.

The permeance control section 67 and 123 can be any of the species shown in FIGS. 2, 3, 4, or 5 or a simpler device capable of switching the permeance of the flux paths. No progressive, apportioned control is required as in the other devices of this application.

The commutated reactors of FIG. 6 operate to oppose an overcurrent in a direct current power circuit. This is accomplished by the commutated inductive reactors 65 and 66 in producing an average counter electromotive force to reduce the average current in the power circuit. So long as the current in the line is within predetermined limits, reactors 65 and 66 produce no reaction from the control system. The only effect that the control system has on the power circuit at such time is the introduction of the small resistance of the reactor windings 68 and 73. However, when the current in the power circuit exceeds a predetermined value, the control system will respond to reduce and limit the current in the power circuit to a safe, predetermined value. This is accomplished by controlled counter electromotive forces produced alternately in reactor windings 68 and 73. Undesired excessive current in a power circuit is, therefore, reduced by the average bucking voltage produced by the combined action of the reactors. With the current in the power circuit thus limited, the undesired effects of overload or short circuit conditions are eliminated. The current is brought into safe limits until the decision is made, within the control circuitry 78, to either remove the control if the overcurrent disappears or open the power circuit if the overcurrent persists.

Variations in the current level in the power circuit are sensed by current sensor 75. The output voltage of sensor 75 is compared, in the threshold limit sensor-1 85, with a preset threshold voltage selected to establish the current limit in the power circuit. In the circumstances where a transient overcurrent can be tolerated, an external control 79 can supply a threshold voltage level change through lead 81 to override the internal preset threshold. Within threshold limig sensor-1 85 a delay means requires that the overcurrent persist for a predetermined time, usually very short, before the output signal therefrom is produced to activate the control system. This is to inhibit control operation resulting from normal power circuit transients. Also, the external control 79 can initiate a command signal that can energize the logic circuit 111 to effect a direct current switching operation as desired.

When the voltage level from the power circuit current sensor 75 rises above the established threshold in the threshold limit sensor-1 85, the output of sensor 85 applied to junction 87 becomes a signal that enables five events to occur:

1. The state of electronic switch-2 92 is reversed by signals applied through steering diodes 89 and 94,
2. Electronic switch-1 98 is turned on,
3. The AND gates 104 and 105 are enabled by the turn-on of electronic switch-1 98,
4. Timing generator 107 is started by a signal applied through connector 106 from turned-on electronic switch-1 98, and
5. Circuit breaker logic circuit 111 is activated.

For event 1, the trigger signal output of threshold limit sensor-1 85, applied to junction 87, is directed through strap, steering diodes 89 and 94 and applied as inputs to electronic switch-2 92 to reverse the state thereof. Just prior to such reversal, the output of electronic switch-2 92 over leads 116, 117 to amplifier 118 provides energization current to the respective permeance control sections 67 and 123. In such prior time, electronic switch-2 92 has turned on, for example, the output lead 117 and turned off output lead 116. Amplifier 118 has responded by supplying energization current through leads 124 and 122 to energize permeance control device 123 of reactor 66 to reduce its permeance to its minimum value. Since lead 116 has been turned off, output leads 121 and 122 do not carry energizing current to permeance control section 67 in reactor 65. The flux state in reactor 65 is at this prior time at its maximum value as determined by the current in reactor winding 68.

Event 1, the change of state of electronic switch-2 92, is also a reversal of the output energizing current from amplifier 118 to newly energize, for example, permeance control section 67 in reactor 65. This reduces the permeance of reactor 65 to its minimum value. The energy stored in reactor 65 is substantially dissipated through winding 69 and rectifier 74. Winding 69 and rectifier 74 minimize the amplitude of induced voltage in winding 68 resulting from the collapse of the magnetic field in winding 68. A reverse connected rectifier across the terminals of winding 68 will further suppress the induced reverse transient voltage. Reactor 65 is now prepared for the next commutation cycle. Reactor 66 at Event 1 has its permeance control section 123 de-energized through leads 124, 122 from amplifier 118 wherein permeance in reactor 66 abruptly increases to its maximum value. This enables the buildup of flux in reactor winding 73 resulting from the power current passing therethrough. The initial rise in flux causes a counter electromotive force to be built up in reactor winding 73 and a corresponding reduction in current in the power circuit, the accomplishment sought after in this invention. Beyond this initial point, the induced voltage in reactor winding 73 decreses uniformly with the current correspondingly increasing towards its maximum value. Concurrently, the flux density in reactor 66 increases to a predetermined value below the knee of the saturation curve of the magnetic material thereof. Such flux density is sensed by the flux density sensor 82, the output of which is applied as the input to threshold limit sensor-3 113 through lead pair 84.

Event 2, the turn-on of electronic switch-1 98 has for its purpose the enabling of AND gates 104 and 105, which is Event 3, and the turn-on of timing generator 107, Event 4.

Event 3, is the enabling of AND gates 104 and 105 by the turn-on of electronic switch-1 98 through leads 102 and 103, resectively. Two other inputs are applied to the AND gates. The output of threshold limit sensor-2 112 is applied through lead 114 as the second input to AND gate 104 and the output of threshold limit sensor-3 113 is applied through lead 115 as the second input to AND gate 105. In operation, the flux density sensors 71 and 82 respond to the flux conditions of the respective inductive reactors 65 and 66. In the commutation process, a reactor 66, for example, undergoes an increase in flux density from the time of commutation and such increase is sensed by the flux density sensor 82, in this example, concurrently, the permeance of the other reactor, 65 in this example, is reduced to its minimum value and the corresponding flux density is reduced rapidly to a minimum value. The output of the flux density sensor 82 is applied as the input to threshold limit sensor-3 113 and its signal level is compared to the threshold level preset in sensor-3 113. The rise of the signal level above the threshold triggers the generation of and output signal which is applied to AND gate 105 through lead 115. Since AND gate 105 was enabled by Event 2, the output signal from threshold limit sensor-3 113 is applied through leads 96 and 95 as an input to electronic switch-2 92, to reverse its state.

In Event 4, timing generator 107 has for its function the master control of the duration of the commutation operation. The timing generator is started by the turning on of electronic switch-1 98 and continued for a preset interval at the end of which an output signal is generated thereby and is applied as a turn-off input to electronic switch-1 98, thereby halting the commutation operation. The timing function is performed by a digital counter, a capacitor charge timing ramp or other devices well known in the art. The timing interval is set for a period that overlaps a transient overcurrent condition which could be damaging to connected equipment without the protection offered by this control system.

Event 5, the activation of the circuit breaker logic circuit 111 receives an input signal which turns on an internal logic switch. An internal timing generator which enables the receipt of a second input signal, will reset the internal logic switch if, for example, a second input signal is not received within a preset interval. On the receipt of a second and, for example, a third input signal within this preset interval, conditions are established for the actuation of the operation of the circuit breaker 125 through lead 128. An alternative operation of circuit breaker logic 111 would be to alter the number of cycles arbitrarily to meet the needs of the power circuit conditions in specific applications.

With respect to the illustration in the time sequence chart shown in FIG. 7, the load current is sensed by load current sensor 75 beginning at its normal operating level followed by a transient overcurrent rise 132 to the current threshold level preset in threshold limit sensor-1 85. The dotted line 133 indicates the level of the current which would be reached without the control system of FIG. 6. However, the solid extension following rise 132 drops instantly to a new low level over path 66S by the onset of an inductive reactive effect of the commutating reactor 65 through winding 68, for example, and rises again proportional to the flux buildup in reactor 65. The flux density sensor 71 produces a proportional output that rises until the threshold in limit sensor-2 is reached. Upon the arrival at the said sensor-2 threshold, an output signal is produced by sensor-2 which passes through the enabled AND gate 104 to reverse the state of electronic switch-2 92 with the result that the energization of permeance control 67 is turned on to reduce the core permeance and the energization of permeance control 123 is turned off to elevate the permeance of the core of reactor 66. The energy stored in the core of reactor 65 at the instant of its reduction in permeance is largely dissipated through the resistances of the reverse transient suppressor winding 69 and rectifier 74 by the induced high level of transient current. In this way, the core is rapidly reduced to a near unmagnetized state with a minimum of reaction in the reactor winding 68.

A portion of this stored energy may be used advantageously in an alternative structural configuration in which a common section of the magnetic core is shared by the two reactors, such as the center leg of a three-legged core. In this case the windings of the two reactors are phased to alternate the flux polarity in the common core section. The stored energy in the common core section serves to enhance the generated counter electromotive force during the commutated switching.

The current waveform segment 66S shown on the time sequence chart in FIG. 7 is a repeated reduced current transition similar to that previously described but now generated by reactor 66. As before, the abrupt increase in the permeance of the near unmagnetized core of reactor 66 initiates a rise in flux generated by the magnetomotive force produced by reactor winding 73 and the direct current circuit current. Concurrently, by self-induction, a counter electromotive force is produced, resulting in a drop of direct current circuit current, as illustrated. Beyond the initial rise in flux in reactor 66 the corresponding induced counter electrotmotive force in winding 73 is reduced from its initial value along a typical exponential path as a function of time, with a corresponding increase in direct current circuit current. The rise of flux in the core of reactor 66 is sensed by flux density sensor 82 and continues to a preselected value below the knee of the saturation curve for the core material. At this level of flux density, flux density sensor 82 actuates threshold limit sensor-3 114 to reverse electronic switch-2 92 through AND gate 105, to continue the commutating reactor process. This commutating process continues until terminated by the output 99S from timing generator 107 which turns off electronic switch-1 98 disabling AND gates 104 and 105 to disable the recycling feedback and, therefore, return the system to a standby condition, provided the direct current power circuit current has returned to its normal operating level. This means that the system is in standby, waiting for the next overcurrent sense trigger 85S from threshold limit sensor-1 85.

With reference to the time sequence chart shown in FIG. 8, the operation of the embodiment of FIG. 6 under sustained overcurrent conditions is described. The circuit breaker logic 111 provides for the accumulation of a preset number of actuating signals before the Event 5, actuation of such logic circuit 111, such actuating signals being generated by threshold limit sensor- 1 95. This is the condition during a sustained overcurrent in the direct current circuit. FIG. 8 shows two operations of switch-1, 98S and 98SS, during which the overcurrent condition persists. After this period, a third signal 98SSS from the threshold limit sensor-1 95 is received by circuit breaker logic 111, which, in this example, is preset to activate a circuit breaker actuation 111S on the third input signal. During the said actuating signal 111S, two events occur. With respect to power circuit breaker with reactor 125 as shown in FIG. 6, at Event 1, the reactor in 125, which includes a built-in source of magnetomotive force, is actuated by the removal of actuating current from its permeance control winding to rapidly elevate the permeance of the reactor core. The effect of this action is to generate a counter electromotive force to oppose the direct current circuit source voltage and, thereby reduce to zero, or near zero, the direct current circuit current at the instant the circuit breaker contacts separate for the Event 2. The operation of the circuit breaker with reactor 125 can be independently operated by an external manual or automatic actuation for the purpose of direct current circuit switching under normal load current conditions and for the purpose of diminishing or eliminating the circuit breaker contact arcing normally associated with direct current circuit switching.

A single reactor structure of FIG. 6 can be modified for continuous progressive inductance variation by automatic electronic means by controlled activation of the winding of the permeance control section. This configuration is useful in a shunt for controlled suppression of the transient rise in line voltage during load changes or line switching.

High power direct current transmission and distribution systems are critically dependent upon reliable, effective, and nondeteriorating circuit protection and switching gear. Responsive to this need, this invention applies permeance controlled reactors in a programmed sequence to protect against destructive transient overcurrent by controlled reactively induced counter voltages in the power current. For a sustained overcurrent, a circuit breaker operation is initiated coincident with a monentary suppression of the circuit current by a specially configured permeance switched reactor controlled within the programmed sequence. For routine switching functions, the same components are used and actuated by a separate circuit.

INTRODUCTION TO OTHER MODIFICATION

Figure 9:
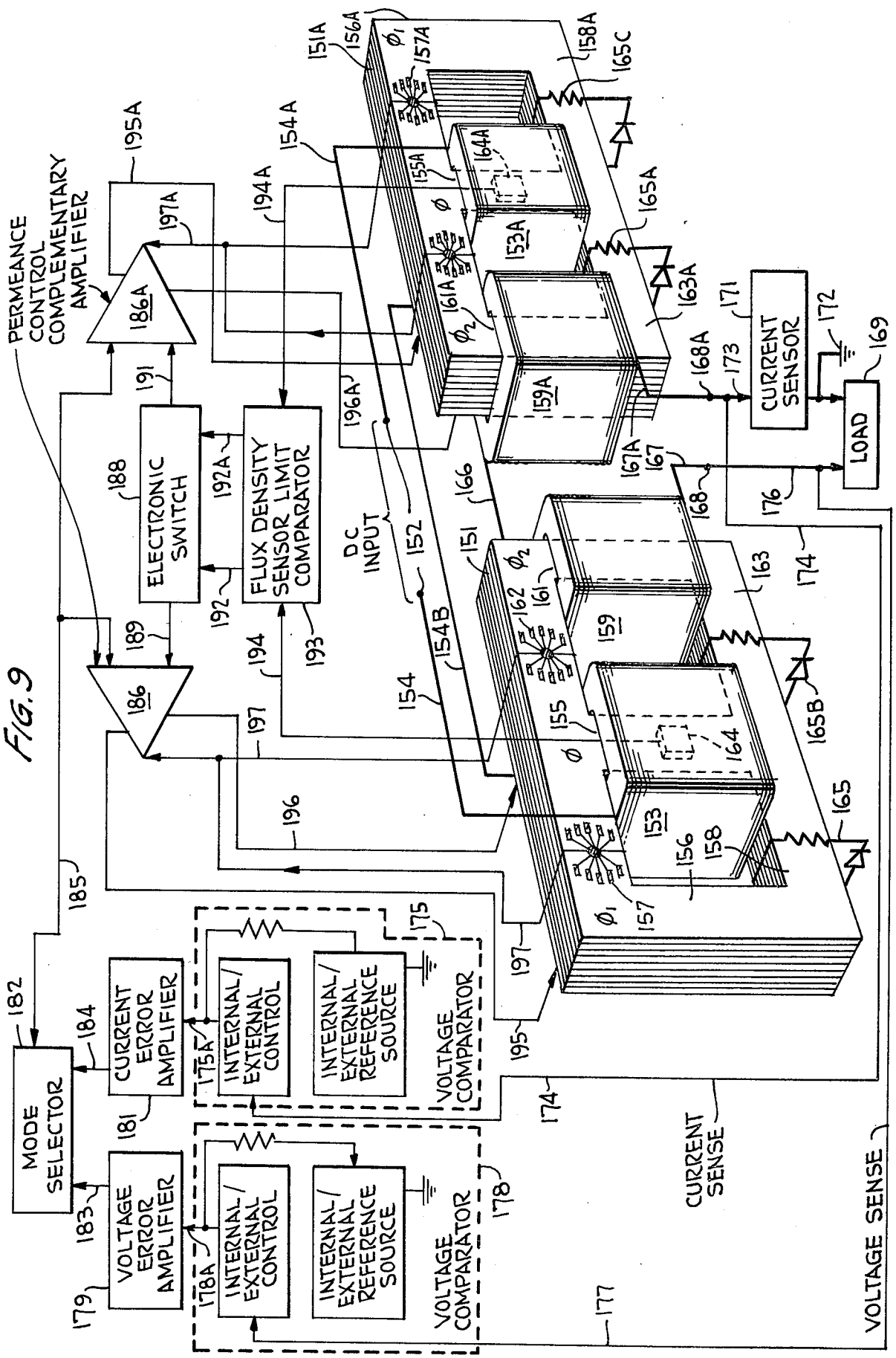
FIG. 9 shows a direct to direct current power converter.
Figure 11:
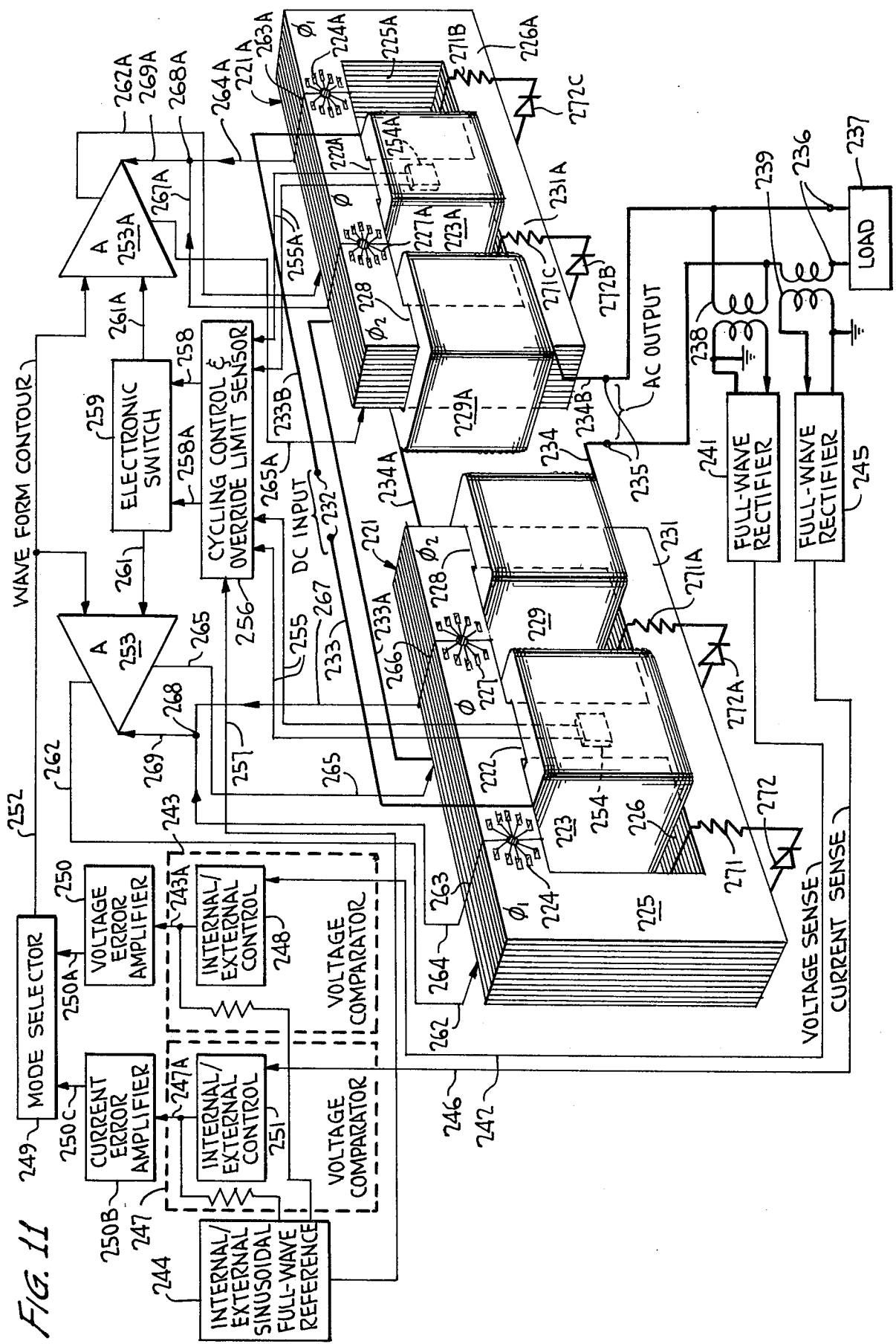
FIG. 11 shows a direct to alternating current power converter.
Figure 13:
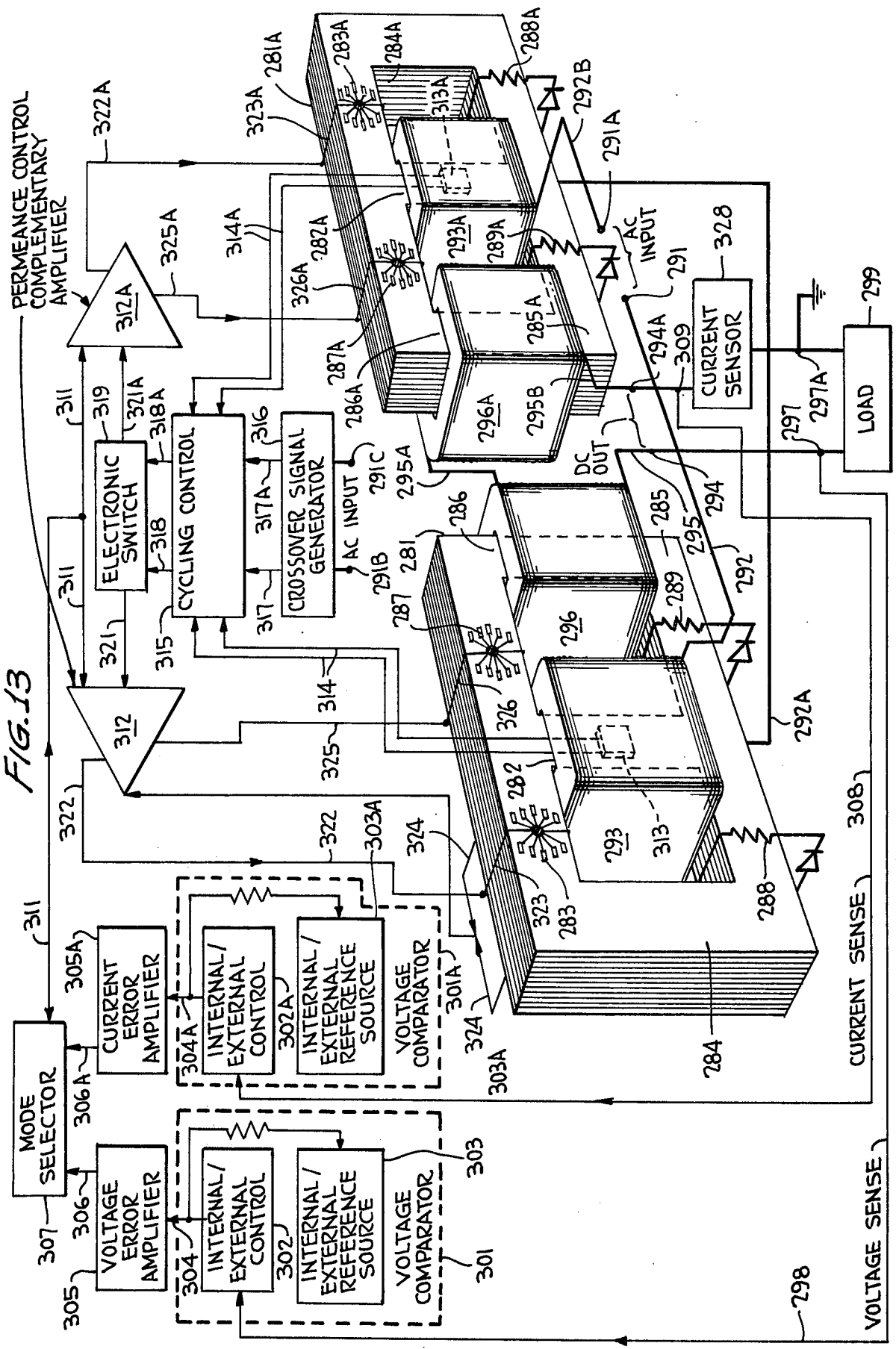
FIG. 13 shows an alternating to direct current power converter.

In the subsequent modes following in this specification, FIG. 9 shows direct to direct current power conversion, FIG. 11 shows direct to alternating current power conversion, FIG. 13 shows alternating to direct current power conversion, and FIG. 15 shows a frequency converter. These four conversion means, in addition to the alternating to alternating current converter of FIG. 1, cover the modes of electric power conversion. Inherent in all of these power conversion devices is the means to effect a control an stabilization of electric power to end utilization devices, in addition to providing control feedback means from a sensed physical state to the end utilization means. Further, programmed suppression of the output power by the inherent control means contributes to circuit switching operations. Conversion and/or control of power by these means occurs with a minimum power loss.

DIRECT TO DIRECT CURRENT CONVERTER EMBODIMENT OF FIGURE 9

FIG. 9 shows the direct to direct current converter of this invention. Two identical three-legged magnetic cores 151 ad 151A are used to provide for the subdivision of direct current input power into a series of direct current power pulses by means of alternated operation between the two identical magnetic structures. The subdivision of input direct current power in this way enables the distribution of power pulses first within one core then the other alternately, so that the net effect is that an alternating sequence of control between the two structures effects control of direct current power continuously.

The power control flexibility inherent in the feedback circuit enables not only the stabilization of a preset output voltage or current but also the dynamic excursion of output voltage or current under the control of an external programming signal. This may yield unidirectional pulse waveformes of varying duty cycle and wave shape.

A direct current source of any voltage, current level or source impedance can be connected to input terminals 152. Serially connected to the input terminals 152 are input windings 153 and 153A through leads 154, 154A and 154B, respectively. Input winding 153 is mounted on center leg 155 of core 151 and input winding 153A is mounted on center leg 155A of core 151A. Bypass leg 156 of core 151 and bypass leg 156A are connected to the input legs 155 and 155A, respectively, by permeance control sections 157 and 157A, respectively, at one end of each thereof and through return sections 158 and 158A, respectively. Output winding 159 is mounted on output leg 161 or core 151 and output winding 159A is mounted on output leg 161A of core 151A. Output leg 161 is connected to input leg 155 through permeance control 162 at one end thereof of each and through return path 163 at the other end thereof. A flux density sensor 164A is mounted intimately on leg 155A within winding 153A. Reverse transient suppressor 165 is mounted on return section 158, reverse transient suppressor 165A is mounted on return section 163A, reverse transitn suppressor 165B is mounted on return section 163, and reverse transient suppressor 165C is mounted on return section 158A.

Output windings 159 and 159A are connected so as to be serially aiding through connector 166 and leads 167 and 167A from windings 159 and 159A to output terminals 168 and 168A, respectively. The load 169 is connected to the output terminals 168 and 168A. A current sensor 171 is connected between terminal 168A and the ground side of the load 169 as indicated by ground 172. Lead 173 connects the ground side of output terminals 168A and current sensor 171. Connected to lead 173 is a current sense lead 174 which is connected at its other end as the input lead to a current sense voltage comparator circuit 175. A lead 176 is connected between the high potential side of output terminal 168 and the load 169. Connected to lead 176 is a voltage sense lead 177 which is connected at its other end as the input lead to a second voltage comparator circuit 178.

The voltage comparator circuits 175 and 178 provide error signals that represent the deviations of feedback voltage or current sense voltage from an external or internal reference The error signal from the voltage sense comparator 179 is connected as the input to the voltage error amplifier 179 and the error signal from the current sense comparator 175 is connected as the input to the current error amplifier 181. The voltage comparators 175 and 178 can be of configuration or design well established in the state-of-the-art. A mode selector 182 has for its inputs the output of voltage error amplifier 179 through connector 183 and the output of current error amplifier 181 through connector 184.

The mode selector 182 selects which of the voltage comparators 178 or 175 will provide feedback control to the permeance control complementary amplifiers 186 and 186A. The output of the mode selector 182 is connected through connector 185 as the input common to both permeance control complementary amplifiers 186 and 186A. The output of an electronic switch 188 is connected through connector 189 as a second input to a permeance control complementary amplifier 186 and through connector 191 as a second input to permeance control complementary amplifier 186A. The inputs to the electronic switch 188 are connected through connectors 192 and 192A from flux density sensor limit comparator 193. The inputs to the flux density sensor limit comparator 193 are from flux density 164 through connector 194 and from flux density sensor 164A through connector 194A. The outputs of permeance control complementary amplifier 186 are the energizing leads 195 and 196 and the common return leads 197A.

OPERATION OF THE DIRECT CURRENT CONVERTER IN FIGURE 9

The control of direct current power in the conversion process is accomplished by treating the continuous stream of direct current power as a contiguous series of direct current power pulses, each of which can be controlled in a transformer-like structure. The embodiment of this concept is shown in FIG. 9 with control amplifiers 186 and 186A connected to identical structures 151 and 151A comprising the power pulse transformers which are alternately switched to sustain direct current power flow. A series connection of input windings, i.e., primaries, permits the exchange of energy flow between the two structures through the alternated permeable magnetic core paths associated with the respective input windings. The direct current thus converted is the combination of direct current power pulses alternately controlled between the two structures and reconstructed into a continuous direct current power flow by the series aiding connection of the output windings, i.e., secondaries, at predetermined voltage or current levels.

In the conversion process, each power pulse transformer is subjected to three operating states, namely: active, transitional, and inactive.

Active state. The permeance of the magnetic core is at its maximum and direct current energy is transferred between input 152 and output winding 159 in a pulse period determined by the rising flux amplitude to a point in time where the permeability of the core will decrease.

Transitional state. The onset of the transfer between power pulse transformers which is initiated by the flux density limit sensor 193 associated with the previously active power pulse transformer, which is now switched off magnetically by reducing core permeance to a minimum through saturation of both permeance control section 157 and 162. At this time, the previously inactive power pulse transformer is activated by unsaturating its respective permeance control sections and allowing them to be subjected to the control currents dictated by the feedback system to produce the required output voltage and/or current level. In this period, most of the magnetic energy stored in the previously activated core structure is absorbed and dissipated by the associated reverse transient suppressor. The residual transient across the output winding can be further attenuated by an appropriately polarized rectifier across the output winding terminals.

Inactive state. In the inactive state, the power pulse transformer is rendered ineffective by the reduction of permeance in its core by the current saturation of its permeance control sections. The reduced permeance of the structure results in a low value of inductance for both its primary and secondary windings, thereby not inhibiting appreciably the flow of power through the active power pulse transformer. The low impedance of the inactive transformer windings act, in effect, to clamp the active winding to the power source or load. In some applications a more effective clamping action is provided by active switching elements for the primary windings and clamping rectifiers for the secondary windings.

At the onset of the inactive state, the magnetization of the core drops from a near saturated state to a reverse residual value induced by the counter magnetomotive force generated by the current through the reverse transient suppressor and the load currents through the input and output windings. This is a desirable effect since it increases the flux excursion from the onset of the active state. A unique operating characteristic is afforded by the continuous control capability throughout the active period, including the time rate of turnon and turnoff. This is in contrast to the uncontrolled operation of currently used power switching devices, such as mercury-arc rectifiers and silicon controlled rectifiers, as used in prior art power conversion systems. These devices are turned on by a triggering signal, and rapidly reach maximum conduction, and remain in this state until current is removed by external means.

Figure 10:
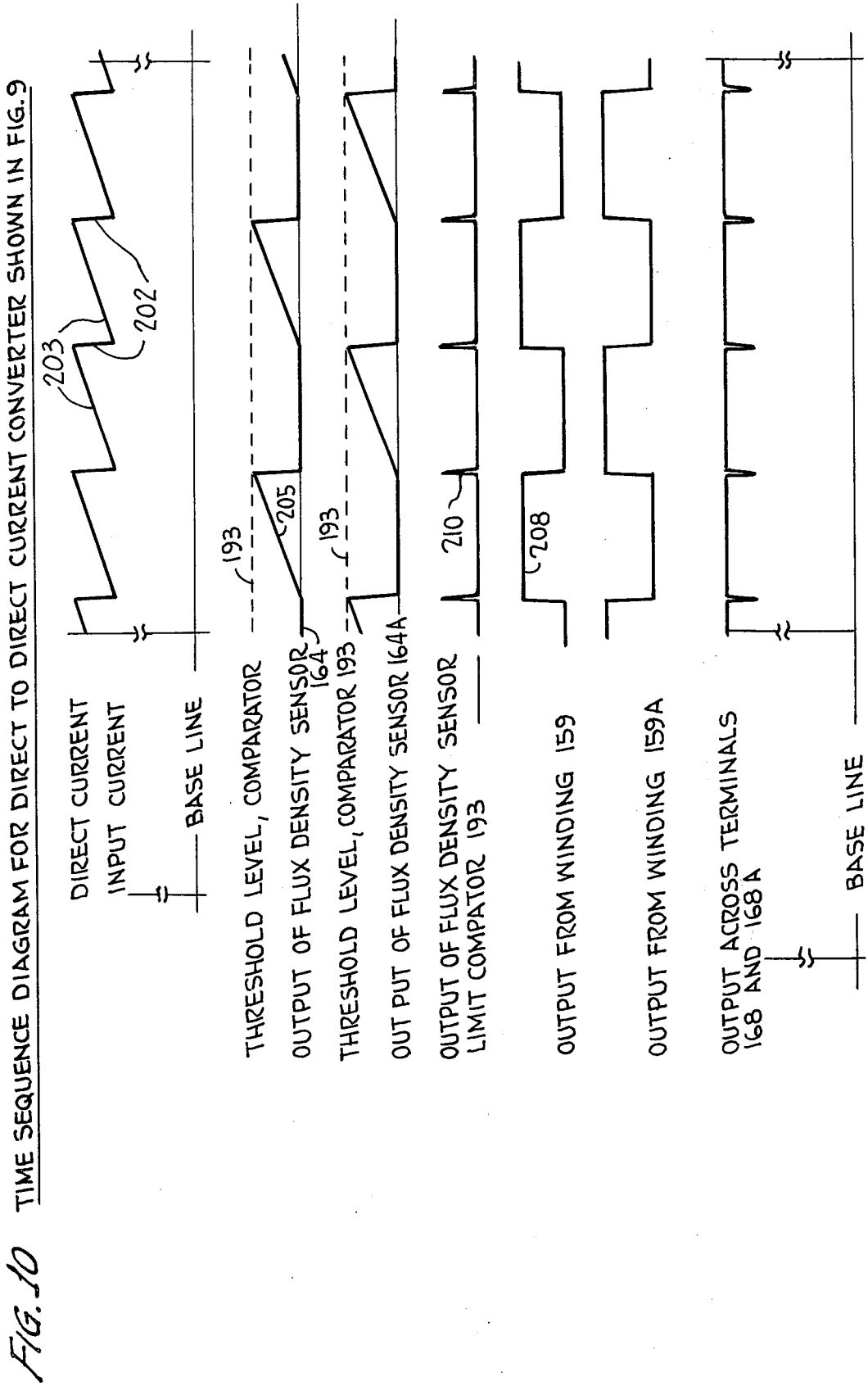
FIG. 10 is a time sequence chart for the operation of the converter of FIG. 9.

With the aid of the time sequence diagram of FIG. 10, the operation details are presented. Direct current power input voltage across terminals 152 produces a direct current input current 201 comprising a sawtooth waveform 202, 203 displaced, by the reflected load current, from a base line. The direct current input 201 is a composite waveform representing the serial addition of the input winding current generated alternately between the power pulse transformers 151 and 151A. Just prior to the switching transition between transformers, the rising current portion 203 is at its maximum value. At the point of transition between transformers, the current drops abruptly over path 202 and represents the onset of the high permeance, unmagnetized transformer structure that has at this time been switched to the active state. The counter electromotive force developed in the input winding 153 determines the lower current point from which the current rises over path 203 to a maximum current value, again representing the near saturated condition of the active magnetic core, at which point a switching transition occurs. The rising current 203 is the magnetic core magnetizing current which is superimposed on a direct current level representative of the reflected output load current.

The gradual rise in current 203 in the input winding of the active power pulse transformer produces a corresponding rise in magnetic flux in the associated core center leg, which is subdivided between the output path and bypass path as dictated by the apportioning complementary amplifier under the control of the feedback system. The controlled rising flux in the first output path 204, 205 is linked with the output winding 159 to induce a direct current pulse 208 in the output winding 159 that appears at the output terminals through the low impedance of winding 159A. Concurrent with the active state of structure 151 is the inactive state of 151A. The output flux path 200, 207 shows no appreciable flux change since the core permeance is maintained at its maximum value, and the output winding in this period has no appreciable induced output voltage 209.

The rising flux over path 105 is limited in its maximum value by the flux density sensor limit comparator 193 which signals the state of near saturation in the active core 151 by producing transition switching signal 210 to initiate the transition between the two power pulse transformers. The time period for the flux excursion over path 205 is directly related to the size and magnetic characteristic of the magnetic structure. For a reduced excursion time and, consequently, the size and weight of the magnetic structure is proportionately reduced.

That portion of the total flux excursion in the input path 155 of core 151, for example, transferred to the output leg 161, induces a voltage in the associated output winding 159 in response to the preset condition established by the feedback circuit.

In the transitional state, the magnetic flux stored in the active core represents stored energy that is to be dissipated. The drop in flux at this time would occur abruptly in a fast switching action and produce thereby an undesirably large induced reverse voltage transient in the output circuit. To reduce this transient effect, two devices are employed: first, the reverse transient suppressor winding with diode 165 to absorb and dissipate a portion of the stored magnetic energy, reducing the transient in the output and input circuits; and second, the controlled turnon and turnoff time of the two power pulse transformers over a crossover path to minimize the rate of flux decrease, and consequently, the amplitude of the induced reverse voltage transient. The voltage output to the load will, therefore, be a uniform direct current level with small reverse spikes marking the points of transition. These transient pulses are of small consequence since they are diminished by external filtering, or by the natural filtering of the power distribution circuits.

Replacing the direct current reference voltage source in voltage comparators 178 and 175 with an external reference signal, the output power at terminals 168 and 168A can be generated in the form of unidirectional power pulses of varying duty cycle and waveform. Furthermore, these excursions of power may be in the form of controlled voltage or controlled current. This may also be achieved by programmed external voltage or current controls in the respective voltage comparator circuits 175 and 178.

Response of the feedback circuit to output variations or switching excursions would normally be limited by the time lag introduced through the inductance of the control winding of the permeance control section. However, the design of the drive amplifier, using established techniques, is configured with a constant current control characteristic which affords a high dynamic resistance to greatly diminish the ratio of circuit inductance to resistance, or time constant, of the permeance control drive circuit. This permits design flexibility in the control of response time to satisfy specific requirements.

In this invention a dual combination of controlled electric power transforming devices are commutated to permit the subdivision of direct current power between the transforming devices into direct current power pulse form. In this form, the direct current power can be transformed by controlled electromagnetic induction into predetermined stabilized output levels. The merging of the direct current power pulses at the output of the dual combination of transforming devices restores the continuous flow of direct current power. This output may be further modified by internal and/or external control into a variable amplitude waveform or a programmed step change of amplitude and/or pulse duty cycle.

The conversion and control flexibility of this invention permits the implementation of large scale direct current power transmission and distribution networks. Remotely programmable output of these power interfacing devices enables highly efficient direct current power switching by time phased momentary suppression of output, during circuit breaker operation.

In direct current utilization devices, such as traction and vehicle drives, this invention permits uninterrupted variation of power to the direct current drive motor with a minimum loss of power in the controlling means. This is in contrast to the pulse-time controls using electric switching devices and power consuming rheostats.

The combination of direct current power subdivision into direct current power pulses and controlled electric induction, both achieved by the switching and progressive control, respectively, of magnetic circuit permeance in transformer-like structures, as described in this invention, is a pioneering technology for direct current power systems. With these principles and the previously described structures for direct current overcurrent suppression and direct current power circuit switching, the wholly unexplored area of direct current power transmission and distribution in network configurations is now possible.

In a generalized direct current to direct current power converter, direct current power from any source is transformed to direct current power at any selected and stabilized voltage or current, and continuously adjustable below preestabilished limits. In addition, unidirectional power pulse generation of varying duty cycle and frequency is a capability of this generalized converter. The invention described herein uniquely satisfies these requirements for a generalized direct to direct current converter by employing a pair of permeance controlled power pulse transformers in a commutated mode. The subdivision of input direct current power into consecutive power pulses by this means enables the controlled electric induction in the respective power pulse transformers, the outputs of which are combined to yield the desired output direct current power form. A feedback system to control the pulse transformer pair contains a stabilizing reference voltage and means for output adjustment or modulation by internal or external devices.

DIRECT TO ALTERNATING CURRENT POWER CONVERTER FIG. 11

FIG. 11 shows the direct to alternating current power converter of this invention. Two identical three legged magnetic cores 221 and 221A are used to provide for the subdivision of direct current input power into a series of alternating current power pulses by means of alternated operation between the two identical magnetic structures.

In this invention, direct current power is transformed into alternating current power of sine waveform by a controlled magnetic circuit configuration which, in addition, provides power control capabilities through an integrated feedback system to satisfy specific load characteristics. This is a unique combination and advances the state of the art beyond that currently practiced which entails, among other limiting elements, separate function elements as switching transistors, silicon controlled rectifiers, or plasma discharge devices, a voltage coupling transformer, and a low pass or resonant filter.

Conversion and control is accomplished by subdividing the input direct current power into consecutive power pulses through the medium of the alternately activated permeance controlled power pulse transformers and then transforming such power pulses into consecutive positive and negative lobes of sine waveform which are then combined at the output circuit. In this way a low level sine waveform reference signal, injected into the feedback system, is amplified into alternating current power. This power control flexibility enables, in general, the transformation of direct current power to a range of predetermined alternating waveforms, and operation at a range of frequencies, limited only by the availability of permeable magnetic materials for the highest frequency structures.

In the design of practical systems, the transformer-like construction of the magnetic elements permits scaling of power levels, voltage, and current to values limited only by the state of the art in power transformer technology. Additionally, polyphase interconnection, typically three phase, is simply made by the wye or delta connection of the outputs of three single phase converters with an alternating current sine waveform reference signal appropriately phased.

The flux excursion in each transformer core structure is limited to approximately one half of the flux excursion within a conventional alternating current power transformer for the same power frequency. This inefficiency in core utilization must be assessed in terms of overall performance advantages in a system tradeoff consideration.

A unique direct to alternating current conversion principle emerges from this invention that permits the generation of low frequency power, typically 60 Hertz, from a direct current power source, with much smaller magnetic components that would be previously dictated by the 60 Hertz requirement. By the arbitrary selection of small magnetic structures, size of such structures determines the power frequency that can be supported. Self generation of high frequency power is determined solely by structure size and magnetic properties. Power at this frequency is then modulated fully by a control signal frequency of the desired 60 Hertz through the feedback control system. The 60 Hertz power is derived from the modulated power envelope by alternately switched controlled rectifier pairs which extract the positive and negative lobes, respectively, of 60 Hertz power.

An important contribution of this invention is that this system makes use of static magnetic devices to generate sine waveform power.

The two identical three legged magnetic cores 221 and 221A are the same in structure and in operational capabilities. Referring to one of the cores, 221, for purposes of explanation, the structure constitutes a pair of magnetic paths through which flux can be controllably routed for generating sine waveform pulses from timed pulses of direct current flux generating inputs. A center leg 222 has input winding 223 therearound. A closed bypass path includes the permeance control section 224, bypass leg 225, connection arm 226 and center leg 222. A closed output path includes a second permeance control section 227, output leg 228 with output winding 229 therearound, connecting arm 231, and center leg 222.

Direct current is applied as an input to this device to terminals 232 through input lead 233 to winding 223 and on through lead 233A to winding 223A and through lead 233B back to terminals 232. The leads 233, 233A and 233B connect windings 223 and 223A in series. Output windings 229 and 229A are also serially phase-opposing connected through lead 234, winding 229, lead 234A, winding 229A, and lead 234B. Output terminals 235 are across leads 234 and 234B. To output load terminals 236 is connected load 237. Between the output terminals 235 and load terminals 236 are connected a voltage sensing transformer 238, with primary windings thereof connected across the output leads 234 and 234B, and a current sensing transformer 239, with primary windings thereof connected in series with the grounded side of output 234 and the corresponding load terminal 236. The secondary winding of the voltage sensing transformer 238 is connected as an input to a full wave rectifier 241 which presents an input through connector 242 to a voltage comparator 243 wherein the voltage representation of the system output is compared with a voltage signal from an internal or external sinusoidal fullwave reference source 244. The secondary winding of current sensing transformer 239 is connected as an input to a second fullwave rectifier 245 which presents an input through connector 246 to a voltage comparator 247 wherein the current representation of the system output is compared with an internal or external sinusoidal fullwave reference source 244. Internal or external control 248 in voltage comparator 243 is used to provide the set points for the comparator. This is in the form of an amplitude adjustment. Voltage comparator 243 produces an error signal indicative of the voltage variations in the output of the system and supplies such information through voltage error amplifier 250 as an input to a mode selector 249 through a connector 250A. Voltage comparator 247 has an internal or external control 251 which is used to provide the set points for the comparator. The output of such voltage comparator 247 is an error signal indicative of the current variations in the output of the system and supplies such information when dictated by load conditions as a second input through current error amplifier 250B and a connector 250C to mode selector 249. Voltage or current control selected by the mode selector is determined by the respective set points in relation to load conditions. Lead 252 is connected to the output of the mode selector 249 and extends to be one of the inputs to each of a pair of complementary drive, flux apportioning amplifiers 253 and 253A.

A flux density sensor 254 is secured to center leg 222 of core 221 in such a manner as to be responsive to flux density changes within such leg 222. A pair of connector leads 255 connects the output of sensor 254 as a first input to a cycling control and override limit sensor 256. A second flux density sensor 254A is secured to center leg 222A of core 221A like sensor 254 is connected to leg 222. A pair of connector leads 255A connects the output of sensor 254A as a second input to cycling control and override limit sensor 256. A connector 257 connects an output of the internal or external sinusoidal fullwave reference 244 as a third input to the cycling control and override limit sensor 256. An electronic switch 259 has two input connectors 258A and 258 which are also connected as outputs of the cycling control and override limit sensor 256 and two output leads 261 and 261A. Output lead 261 is connected as a second input to amplifier 253 and output lead 261A is connected as a second input to amplifier 253A.

Amplifier 253 has a first output lead 262 which is connected to one end of a coil 263 of permeance control section 224. The other end of coil 263 is connected to a lead 264. Amplifier 253 has a second output lead 265 which is connected to one end of a coil 266 of permeance control section 227. The other end of coil 266 is connected to a lead 267. Leads 264 and 267 are joined at junction 268 to which also is connected a connector 269. Connector 269 is the return lead to amplifier 253. Amplifier 253A is connected to permeance control sections 224A and 227A in the same manner that amplifier 253 is connected to permeance control sections 224 and 227, with equivalent elements having the letter A added to identical numbers.

A reverse transient suppressor 271 with its unidirectional current device 272 is mounted around leg 226. A second reverse transient suppressor 271A with its unidirectional current device 272A is mounted around leg 231, both of said first two suppressors being mounted on core 221. A third reverse transient suppressor 271C with its unidirectional current device 272B is mounted around leg 231A. The fourth suppressor and current device are mounted around leg 226 on core 221A.

OPERATION OF THE DIRECT TO ALTERNATING CURRENT CONVERTER OF FIG. 11

Direct current power applied to terminals 232 is distributed alternately between input windings 223 and 223A by a commutation process. With a structure 221 in the active state nearly all of the applied direct current input power is transmitted through its input winding 223. The input winding of structure 221A, in its inactive state, absorbs negligible power since its associated magnetic core permeance is at its minimum value.

The time sequence chart in FIG. 12 illustrates the operation of the converter of FIG. 11.

In the time sequence chart of FIG. 12, the topmost illustrated signal represents a typical external alternating current reference signal 244E which is applied to the reference 244. The half cycle shown in interval 273 illustrates the positive half cycle of such external reference signal 244E. Within the internal or external sinusoidal fullwave reference 244, the reference signal 244E is changed, as is any external or internal reference signal source passing therethrough, into a fullwave reference signal 244F. Signal 244F is applied as inputs to the comparators 243 and 247 and to cycling control 256. Within cycling control 256, the fullwave reference 244F are used to produce the commutation trigger signals 258C which are delivered through connectors 258 and 258A as controlling inputs to the electronic switch 259.

Electroni switch 259 functions to activate, alternately flux apportioning amplifier 253 and flux apportioning amplifier 253A. This results in the alternated operation of the two magnetic cores 221 and 221A. The magnetic flux $\Theta_2$ 274 in leg 228 of core 221, for example is illustrated by waveform 274 wherein the flux density increases sinusoidally to a maximum within the first interval 273 as shown in the time sequence chart of FIG. 12. It is to be noted that during this first interval, the magnetic flux $\Theta_2$ 274A in leg 228A of core 221A is at a relatively zero level and effectively inactive. The flux density threshold limit 275 and 275A is set into override limit sensor 256 whereby, when the flux level sensed by flux density sensors 254 and 254A reaches such limit, the override limit sensor 256 will assume control in the event of a failure to reference 244, to limit the operation of the system to a safe condition. During the second interval of the time sequence chart of FIG. 12, the magnetic flux in leg 228 is at relatively zero level while the flux in 228A increases sinusoidally to a maximum. Also in the first interval 273, the induced voltage in output winding 229 rises to form one half of the output sinewave while the induced voltage in output winding 229A is at relatively zero level. In the succeeding interval 276, the induced voltage in the reverse phased output winding 229A rises to form the negative half of the output sinewave while the induced voltage in output winding 229 is at relatively zero level. The interconnection of lead 234, winding 229, lead 234A, winding 229A and lead 234B combine these two half sinewaves to produce the full sinewave output available at output terminals 235.

Stated another way, the onset of the high permeance state of structure 221 causes a rise in magnetic flux from the magnetomotive force developed by input winding 223. The rise in flux is coupled to the output path 228 and bypass path in the proportion dictated, typically, by a sinewave form signal through the voltage comparator 243 or 247 and permeance control flux apportioning amplifier 253. The rising flux coupling the output winding 229 generates the output voltage which serves the load requirement. The sine waveform lobe induced in winding 229 is followed by a contiguous sinewave lobe of opposite polarity induced in reverse phased winding 229A during the following activation of magnetic structure 221A. The series apposed ouput windings 229 and 229A combine the alternate sinewave output power pulses into sinusoidal alternating current power.

Voltage feedback and current feedback signals over leads 242 and 246, respectively, are processed by the fullwave rectifiers 241 and 245, respectively, to produce fullwave unidirectional sine waveforms for application to the respective voltage comparators 243 and 247, where the deviation of the sinewave form and the amplitude output from the sine waveform control signal 244 appears as an error signal at connections 243A and 247A for voltage and current, respectively. These error signals are amplified by their respective error amplifiers 250 and 250B, the outputs of which are combined in mode selector 249 which establishes either a voltage or current control operation mode as determined by the respective control setting at the voltage comparators 243 and 247 in combination with the demand of the load connected to output terminals 235.

Sine waveform reference source 244 supplies fullwave unidirectional waveforms to each voltage comparator 243 and 247 and of opposite polarity to the feedback voltages. In addition, the fullwave unidirectional waveform is applied as an input to the cycling control 256. The cycling control 256 generates the commutating signal 258C for electronic switch 259 from the zero crossover points of the fullwave reference signal from 244. Signals from flux density sensors 254 and 254A are applied to the override limit sensing function of 256 and serve as a safety override in the event of reference signal failure.

To minimize the response time feedback system to output variation and switching activations, the permeance control drive amplifer is designed with a constant current control characteristic. The inherent high dynamic resistance of this configuration greatly diminishes the reluctance over resistance time constant of the permeance control circuit.

Although the previous description covers sine waveform generation, the invention is sufficiently versatile to enable the conversion from direct current to virtually any arbitrary alternating waveform, that is to say, squarewave, sawtooth waveform, triangular waveform, and the like.

A simpler configuration of the invention is afforded for squarewave alternating current generation by eliminating the feedback circuitry and applying external commutating pulses to the commutating switch 259, through cycling control 256. These external commutating pulses must have a period less than the inherent rise time of flux in core 221 and 221A up to the point where the flux density sensor 254 and 254A signals the termination of the period.

Magnetic energy stored throughout the activated period in a pulse transformer is normally dissipated as thermal energy in the reverse transient suppressors 271, 271A, 271B, and 271C. During the transitional period at the time of commutation between pulse transformers. In large power handling equipment, this stored energy may be economically recovered by charging a capacitor bank or secondary battery to provide a power source for accessory applications.

The direct to alternating power converter as described herein is uniquely applicable as the terminal subsystem of the direct current power transmission system and for the conversion of electrical power derived from advanced primary energy converters, which are inherently direct current generators. These advanced sources are: magnetohydrodynamic generators, electrofluiddynamic generators, thermionic and thermoelectric generators, solar cells, and the projected controlled thermonuclear fusion direct conversion generators.

As an electrical energy coupling means to supply the input of an electrical power transmission system or its terminal subsytem converter, permits the introduction of external control means to effect the mangement of network power distribution and control by computer or other automatic means.

Alternating current power generated by conversion from a direct current power source is required to be of sine waveform for most applications and, furthermore, be stabilized and adjustable over a wide range of voltage and current. In this invention, these requirements are completely satisfied by commutated permeance controlled pulse transformers, which subdivide the direct current input power into consecutive power pulses. Controlled electric induction in each of the pulse transformers is accomplished through a feedback system including a stabilized reference waveform and a means for internal or external voltage or current adjustment. The combined output of the commutated pulse transformers forms the useful alternating current power source.

ALTERNATING TO DIRECT CURRENT POWER CONVERTER OF FIG. 13

In this invention, alternating current power is converted to direct current power through the dynamically controlled electromagnetic induction in commutated power pulse transformers. The input alternating current power sine waveform is treated as a consecutive series of power pulses of sine waveform and alternately reversed polarity. Two permeance controlled power pulse transformer structure and associated control amplifiers of identical structure are assigned, respectively, to the positive and negative lobes of input alternating current power and alternately activated to respond to its assigned input power lobe.

A feedback system including reference voltage comparison circuitry, and output adjustment means provide the controlling action to transform the sine waveform input power into contiguous unidirectional direct current power pulses of nearly constant amplitude. This invention is unique in its ability to combine the separate state of the art functions of voltage transformation, rectification, filtering, and voltage and current control into a single operation within the controlled magnetic structure described herein. In addition, the transformer-like structure of the embodiments of this invention permits the scaling to any voltage, current or power level to the limits imposed by state of the art electrical power transformer technology.

A further unique characteristic of this invention is its ability to allow the desired physical state of the load to control the output of the converter through the feedback circuit.

Polyphase applications of this invention are easily achieved by the series or parallel connection of the direct current outputs from the separate phases of alternating current input, with voltage and/or load current sharing provided by the automatic voltage or current control in the feedback system. The flux excursion in each transformer core structure is limited to approximately one half of the flux excursion within a conventional alternating current power transformer. This inefficiency in core utilization must be assessed in terms of overall permeance advantages in a system tradeoff consideration.

This invention makes use of variable magnetics for controlling electromagnetic induction to change sine waves into contiguous direct current pulses.

Turning now to the drawing, FIG. 13 shows the structure whereby an alternating current input is converted into a direct current output.

Two permeance controlled power pulse transformer structures, or cores, 281 and 281A are made of laminated elements as previously described. Core 281 is configured to have an input leg 282, a first permeance control section 283, a bypass leg 284, a return leg 285, and output leg 286, and a second permeance control 287. Around the bypass leg 284 is a first reverse transient suppressor 288 and a second reverse transient suppressor 289 is around return leg 285. For core 281A, the identical components as found in core 281 are numered with an additional A. An alternating current input applied at terminals 291, 291A is connected through a first connector 292, an input winding 293 on input leg 282 of core 281, a seond connector 292A, a second input winding 293A on input leg 282A of core 281A, and a third connector 292B back to terminal 291A. A direct current output is available at output terminals 294 and 294A. A first output connector 295 connects terminal 294 to an output winding 296 on leg 286 of core 281. A second output connector 295A serially connects output winding 296 to a second output winding 296A on leg 286A of core 281A and a third output connector 295B connects said output winding 296A to said output terminal 294A. The system load is connected to output terminals 297 and 297A.

The control structure for the above cited power structure is now set forth. Between output terminal 294 and a load terminal 297 is connected a voltage sense feedback connector 298 which is an input to a first voltage comparator 301 wherein the desired voltage variations are introduced. An internal or external reference source 303 which supplies the reference voltage level against which the actual output feedback voltage is compared in order to produce an error signal indicative of the deviation from the desired voltage output, as established by the internal or external control 302. The error signal is supplied through a connector 304 to a voltage error amplifier 305 which, through an output connector 306, provides an input to a mode selector 307. The mode selector 307 determines whether the voltage error or the current error is dominant and will be applied as the control mode. The current error is derived from a signal supplied through current sense connector 308 with one end thereof connected at juction 309 which is in a connector between output terminal 294A and load terminal 297A. Also connected between juction 309 and terminal 297A is a current sensor 328 which may be a simple resistor means. Th other end of connector 308 is connected as an input to a second voltage comparator 301A and is connected directly to the internal or external current level control 302A. An internal or external reference source 303A is connected across a voltage drop means to be combined through connector 304A as the output of the voltage comparator 301A, such output is a signal indicative of the current error that exists between the load current through sensor 328 and the current level established by control 302A and reference source 303A. This output is the input to current error amplifier 305A which produces an output through connector 306A which is applied as a second input to mode selector 307. The output of mode selector 307 is connected through a connector 311 as one of the inputs to each of a pair of permeance control complementary amplifiers 312 and 312A, respectively.

A first flux density sensor 313 is mounted in intimate magnetic contact with the input leg 282 of core 281, within input winding 293. Flux density sensor 313 is connected by a connector pair 314 as an input to a cycling control and override limit sensor 315. A second flux density sensor 313A is mounted in intimate magnetic contact with input leg 282A of core 281A, within input winding 293 A. Flux density sensor 313A is connected by a connector pair 314A as a second input to cycling control and override limit sensor 315. The alternating current input applied at terminals 291 and 291A is also applied to control terminals 291B and 291C. To these control terminals are connected the crossover signal generator 316 which provide output signals at the zero crossover points of the input alternating current waveform through connectors 317 and 317A as a third and a fourth inputs to the cycling control and override limit sensor 315. The output of the conrol and sensor 315 is applied through connectors 318 and 318A as controlling inputs to an electronic switch 319. Connector 321 is the means through which a first output of the electronic switch 319 is applied as a second input to permeance control complementary amplifier 312 and connector 312A connects a second output of electronic switch 319. The electronic switch alternately activates the amplifiers 312 and 312A.

Outputs of amplifier 312 are connected through connector 322 to winding 323 of permeance control section 283 back through common connector 324 to amplifier 312, and through connector 325 to winding 326 of permeance control section 287 back through common connector 324 to amplifier 312. The outputs of amplifier 312A are connected indentically as those from aplifier 312 with the identical structural elements being further designated with the letter A.

OPERATION OF ALTERNATING TO DIRECT CURRENT POWER CONVERTER OF FIG. 13

Operation of the alternating to direct current power converter of FIG. 13 is described with reference to the waveform sequence diagram in FIG. 14. Alternating current power input connected to terminals 291 and 291A, as well as 291B and 291C, has its positive lobe energize winding 293 of permeance controlled pulse transformer 281, for example, of the commutated power pulse transformer pair, and its negative lobe energize winding 293A of permeance controlled power pulse transformer 281A. Commutation actuation signals are derived from the alternating current input applied through terminals 291B and 291C to zero crossover signal generator 316 which produces such actuation signals as illustrated by the second waveform in FIG. 14. Alternately assigned to the positive and negative lobes, these signals are connected through 317 and 317A, respectively, to the cycling control 315 to effect the alternation of electronic switch 317; first through connector 318 and then through connector 318A, alternately. Pulse transformers 281 and 281A are thereby alternately activated through their respective amplifiers 312 and 312A by the electronic switch 319 to synchronously accept the positive lobe of the input alternating current power by transformer 281, for example, followed by the negative lobe of the input alternating current power by transformer 281A. The sinewave lobes become power pulses for transformation into direct current power pulses of controlled amplitude.

Pulse transformer 281 in the active state, to continue the example, accepts the positive lobe of alternating current input power through its input winding 293. The flux generated by the input winding 293 in its enclosed core leg 282 is distributed between output path 285, 286 and the bypass path 284 under control of the apportioning permeance control sections 283 and 287 activated by the permeance control complementary amplifier 312. The following negative lobe is similarly treated by transformer 281A. Controlling signals for the complementary amplifiers are dependent upon the predetermined output conditions as established within the voltage comparators 301 and 301A, for constant voltage or constant current operation, respectively. In responding to the desired preset output condition, the permeance controlled pulse transformers extract near squarewave direct current power pulses from the input sine waveform power pulses. This is achieved by the controlled electromagnetic induction in the output windings 296 and 296A and results from the flux apportioned to the output legs of the magnetic structures. The series aiding connection of these windings produce a continuous direct current output with slight depressions in amplitude occurring during the pulse transition periods. These depressions are diminished by the inherent filtering of the output and load circuits. To minimize the responsive time feedback system to output variations and switching activations, the permeance control drive amplifier is designed with a constant current control characteristic. The inherent high dynamic resistance of this configuration greatly diminishes the reluctance over resistance time constant of the permeance control circuit.

Magnetic energy stored throughout the activated period in a pulse transformer is normally dissipated as thermal energy in the reverse transient suppressors during the transitional period at the time of commutation between pulse transformers. In large power handling equipment, this stored energy may be economically recovered by charging a capacitor bank or secondary battery to provide a power source for accessory applications.

It is to be noted that the function performed by these commutated permeance controlled pulse transformers is divided among separate elements in the previous state of the art of alternating to direct current power conversion. That is, an electric transformer is required to transform the imput voltage to the desired level followed by a power rectifying assembly to produce unidirectional power, requiring smoothing filters to reduce the ripple voltage resulting from the rectification process. For stabilized adjustable direct current output, an electronic voltage and current feedback stabilizing subsystem is added. This, the potential savings in complexity and cost by the implementation of this invention is promising.

Alternating to direct current power conversion is the most prominent of electric power conversion requirements. Applications range from bulk power transmission of electrical energy to the excitation of the most sensitive of instrumentation. Performance requirements of this class of converter vary widely. Typically, stabilized output is a primary requirement followed by a means for internal or external adjustment of voltage or current within preestablished limits. In this invention these requirements are satisfied with a unique configuration of permeance controlled pulse transformers. Each of a pair of such transformers is assigned to the positive and negative lobes, respectively, of the input alternating current power. With the feedback system associated with the transformers and sine waveform power is transformed by controlled electromagnetic induction into a stabilized near square waveform of desired amplitude. Combining the outputs of the transformers, a direct current power source is generated with a minimum of filtering required, in contrast to other static conversion systems. Within this configuration are the means for internal or external adjustment of output voltage or current.

For highly estabilized precision direct current sources this configuration of this invention can be used as a preregulator connected to a precision regulator of design already established in the art.

This invention can be configured into a system complex for the bulk transmission and distribution of electrical energy by the more efficient direct current transmission circuit. The instant invention of FIG. 13 forms the source of electrical energy for the direct current transmission circuit, which is terminated at one point or several branch points by the direct to alternating current power converter as described in relation to FIG. 11 of this invention. To provide circuit protection and arcless switching at the terminations of the transmission circuit, the embodiment of FIG. 6 of this invention is uniquely applicable.

Another unique and important capability of this invention is the means for generating a variable frequency source of single phase or polyphase power for synchronous or induction motor drives, and the means for electronic control of the frequency variation and voltage amplitude.

FREQUENCY CONVERTER OF FIG. 15

In this invention, the high frequency alternating current output of a high speed alternating current power generator, for example, is converter to a lower frequency of alternating current power by means of static magnetic circuits responsive to external control means. The high frequency alternating current power input to the magnetic circuit configuration with feedback control interconnection is subjected to an amplitude modulation within the magnetic structure at the desired lower frequency, which is introduced as a control signal in the feedback system.

The modulated envelope of high-frequency power at the output terminals of the magnetic structure is applied to a dual pair of controlled rectifiers which are alternately switched at the zero crossover points of the low frequency control signal. the switched alternate pairs of rectifiers produce alternate positive and negative lobes of power at the low frequency to complete the conversion process.

This invention enables the advantages of the high speed turbine alternator to be more fully realized by the elimination of the gear box and associated reduction in the alternator size and weight. The static magnetic converter operating at the high input frequency is likewise of reduced size and weight. With most of the refined power control invested in the converter, less stringent feedback control to the turbine alternator is required.

For polyphase application, single phase systems are interconnected with appropriate phasing of the respective control signals.

Turning now to FIG. 15, a permeance controlled power transformer 331, made up of laminated elements as previously described, has an input leg 332 with an input winding 333 thereon. An alternating current input of a first frequency $f_1$ is applied to winding 333 at terminals 334. Between a bypass path structure 335 and input leg 332 is a first permeance control section 336. The permeance control sections are discussed in detail earlier in this specification. An output leg 337 has an output winding 338 therearound and there is a second permeance control section 339 located between the output leg 337 and the input leg 332. A bypass path includes the input leg 332, the first permeance control section 336, bypass leg 335 and is completed through the end of the input leg opposite to the end connected to permeance control section 336. An output path includes the input leg 332, permeance control section 339, output leg 337 and is completed through the end of the input leg opposite to the end connected to the permeance control section 339. A source for a second frequency alternating current to which the output from output winding 338 is converted is spplied through a $f_2$ stabilized control signal 341. The output of control signal 341 is applied through connector 342 as the input to $f_2$ crossover signal generator 343. Pulses derived from the zero crossover of the alternating current reference input $f_2$ are respectively associated with the positive and the negative lobes of the $f_2$ waveform. The positive associated lobes, for example, produce signals that are delivered through output connector 344 as an input to an electronic switch 345 and the negative associated lobes produce signals that are delivered through second output connector 346 from generator 343 as a second input to electronic switch 345. A first output of electronic switch 345 is applied through a connector 347 as a first input to a dual pair of commutated demodulating rectifiers 348 and a second input thereto is a connector 349. The commutated demodulating rectifiers 348 can be silicon controlled rectifiers, each with an anode, a cathode, and a gate.

The anode of a first of a first pair of rectifiers, 351, and the cathode of the second of said first pair, rectifier 352, are connected to one end of the winding 338 on output leg 337. The anode of a first of a second pair of rectifiers, 353, and the cathode of the second of said second pair, rectifier 354, are connected to the other end of the winding 338 on output leg 337. The cathode of rectifier 351, the anode of rectifier 352, the cathode of rectifier 353, and the anode of rectifier 354 are all connected to output connector 355. Connector 347 is connected between the output of electronic switch 345 and the gate of rectifiers 351 and 353, respectively, in the commutated demodulting rectifiers 348. The other output of electronic switch 354 is connected through connector 349 to the gate of rectifiers 352 and 354, respectively. A center tap 356 on winding 338 on output leg 337 is connected to the grounded output terminal 358.

The feedback circuitry includes a feedback connector 361 connected at one end to output connector 355 and at its other end to an alternating to direct current fullwave converter 362, a first element in a voltage comparator, such as a voltage comparison bridge, and the like. A connector 363 connects converter 362 to an internal or external voltage control 364, the output of which is connected through a connector 365 as an input to a complementary amplifier 366. A connector 367 connects converter 362 to a voltage reference 368, and to said amplifier 366 as a second input thereto, and to a common. A second input to voltage reference 368 is applied through connector 359 which is connected as a second output of the $f_2$ stabilized control signal 341. Connected between the voltage reference 368 and connector 365 at a junction 371 is a fixed voltage drop device 369 to complete the voltage comparison bridge.

The outputs of amplifier 366 are connected through connector 372 to coil 373 of permeance control section 336 and through connector 374 to coil 375 of permeance control section 339, the other ends of coils 373 and 375 being connected to a return connector 376 back to amplifier 366.

OPERATION OF THE FREQUENCY CONVERTER OF FIG. 15

The operation of the frequency to frequency converter shown in FIG. 15 is described with the aid of the waveform frequency diagram of FIG. 16. High frequency alternating current input power $f_1$ is connected to input winding 333 of the permeance controlled alternating current transformer 331, a structure similar to that in FIG. 1. A stabilized low frequency sinewave input control signal $f_2$ from $f_2$ stabilized control signal 341 serves two control functions in the conversion of $f_1$ power to $f_2$ power. The first of these functions is the modulation of $f_1$ power through the voltage comparator and permeance control amplifier 366. At the voltage comparator, the reference control signal $f_2$ is presented as a unidirectional fullwave sine waveform, 377 in FIG. 16. This reference voltage is, for example, of positive polarity with respect to ground reference. The feedback reference output signal over lead 359 is similarly converted to a unidirectional fullwave negative sine waveform at the voltage comparator for comparison with the reference voltage. An error signal generated at the voltage comparator and available at junction 371 is directed to the permeance control complementary amplifier 366 to effect the apportioning of flux in the permeance controlled transformer to achieve the complete modulation of the transformed $f_1$ power by the $f_2$ reference signal.

To effect a totally modulated envelope of $f_1$ output power by the $f_2$ reference signal, the voltage comparator provides the means for continuous tracking of the reference waveform by the feedback waveform, where deviations in the feedback signal are detected and amplified through the permeance control amplifier 366. The resulting apportioned drive currents through the permeance control sections 336 and 339 effect a division of magnetic flux from the input leg 332 to the output and bypass legs 337 and 335, respectively, to preserve the total modulation of $f_1$ output.

The second control function of the stabilized $f_2$ input signal is, after the extraction of zero crossover pulses by generator 343, applied to the electronic switch 345, to effect the control of output rectifiers 351, 353 and 352, 354. FIG. 16 shows that while lead 347 is activated to turn off the gates of rectifiers 351 and 353, lead 349 is activated to turn on the gates of rectifiers 352 and 354, and vice versa. The alternate control of rectifier pair 351 and 353 and of rectifier pair 352 and 354 produce a positive and negative lobe from the modulated $f_1$ envelope appearing at output winding terminals 357 and 358 of the permeance controlled transformer.

For compact, Hertz. and mobile high power alternating current power sources, a high speed turbine alternator is desirable. However, the generated power frequency is too high for most applications and must be reduced to standard frequencies, typically 50 or 60 Hetz. In this invention, a permeance controlled transformer is operated at the high frequency output of the turbine alternator and is, accordingly, of small size and weight relative to that required for 50 or 60 Hertz opertion. A feedback control system, into which a reference signal of the desired output frequency is injected, contains a means to completely modulate the high frequency power output of the transformer by the low frequency reference carrier signal. Consecutive positive and negative lobes of the desired low frequency power is extracted from the modulated envelope by consecutively switched controlled fullwave rectifiers.

SUMMARY

In summation, this invention teaches an advanced concept and provides the embodiment for a universal electrical power conversion and control technology. With the basic structure of transformer-like design, the conversion and control system can be scaled to any voltage, current, or power and limited only by the state of the art in power transformer technology. The frequency of operation is limited only by the available permeable magnetic materials at the highest frequency of operation.

Furthermore, the invention teaches the means for configuring electromagnetic elements of several types for effecting the control of permeance in closed magnetic circuits. Continuous control of permeance over prescribed transfer characteristics is achieved by combined use of magnetic materials of differing chracteristics and structural combinations.

Further, the invention teaches the means for uniformly controlling the dynamic transfer of magnetic flux from a source path to an output path, where electromagnetic induction provides predetermined voltages, currents, and waveforms at an output circuit.

The invention also teaches the means for converting and controlling direct current power through electromagnetic induction means by subdividing the direct current power stream into timed segments which evolve as direct current power pulses that are easily manipulated by electromagnetic circuits, and then recombined to form direct current or alternating current power at an output circuit at controlled voltage or current levels.

This invention teaches the multiple advantages of the integration of a feedback system with the controllable magnetic circuits, affording control flexibility to enable constant voltage or constant current operation, predetermined internal and/or external control of voltage or current, and responsiveness of the system to selected physical states of the power load device.

Further, this invention teaches the means for relatively low energy loss in the conversion and control process as compared to resistors, semiconductors, and plasma discharge devices for this purpose as used in the prior art.

In addition, the invention teaches the means for effecting the smooth control of power to utilization devices by manual or automatic electronic means, and to effect the protection of the electric power circuit against overcurrent, overvoltage, and power factor deviation.

Finally, this invention teaches the means for configuring an electrical power conversion, transmission, and distribution network system with the capability for continuous monitoring of system elements and heirarchal control with computer assist and man-machine interface. This permits the execution of smooth power switching that avoids shock excitation of transmission circuits and minimizes circuit instabilities. This is realized by preprogrammed turn off and turn on of output power from the active transformer-like structures of this invention. Circuit breaker operation is synchronized to occur during the preprogrammed period of suppressed output power.

The bypass of magnetomotive force, inherent in the transformer-like structures of this invention, affords the means for employing the bypass magnetic path to couple power to a program switched dummy load for a prescribed period during power source and network adjustment to a catastrophic circuit failure.

Mojor elements of such an elaborate power network would include a source of electrial energy, a coupling means, a transmisson circuit, a terminal converter, a distribution network, and, possibly a converter required by a load device which utilizes a form of electricity different from that supplied by the terminal converter. Each of these elements would have communication lines to a computer assisted hierarchal control and man-machine interface from which control would be effected for the entire system.

For example, an alternating current power source with an alternating to direct current coupling means, means to transmit bulk direct current power at high voltage over transmission lines to a terminal direct to alternating current converter for local area alternating current distribution network, and a direct to direct current converter connected to the direct current transmisson lines provides for a direct current load network, all controlled by a control with computer assist, make up such a system as taught by this inventor. The alternating current power transmission path would consist of an alternating to alternating current converter, power transmission lines, and a second alternating to alternating current converter connected to a local area network. For direct current loads, an alternating to direct current current converter would be needed to be connected between the alternating current transmission lines and the direct current loads.

Transmission lines and terminal equipment are protected by means resonsive to overcurrent and overvoltage and such means also provides for the performing of programmed circuit switching, in either the alternating or direct current examples. Also, the power network system operating parameters are continualy monitored over communication links by the hierarchal control which covers local, central, and regional areas of the power network. The hierarchal control is assisted by the cmputer at the various network levels and man-machine interface facilities. Responsive control signals are transmitted over communication links to the power coupling converters and switching controls through their accessible external control inputs.

The functions of the reverse transient suppressors which are shown in FIGS. 6, 9, 11, and 13 are to divert away from the input and output circuits and to dissipate the significant, undesired portion of stored energy in a magnetic path during the transition period. The transients resulting from the switching of the stored energy in the magnetic paths are minimized by the suppressors.

I claim:
1. In an electromagnetic induction control means,
   laminated magnetic means having magnetic properties compatible with the magnetic properties of the structure in which the control is utilized,
   a plurality of aperture means in said laminated magnetic means disposed to form a segmented toroid,
   one of said aperture means located along the central axis of sid toroid, an electrical conducting means disposed through said central aperture and each of said plurality of apertures and around the outside of said magnetic means in diametrically opposed positions, said conducting means providing a magnetic field of toroidal configuration having minimum field strength at the outside surfaces of said magnetic means, whereby a radial saturation gradient about said central aperture means and domain rotation is produced in a toroidal configuration with said induction control means.

2. In an electromagnetic induction control means, laminated magnetic means having parallel surfaces, a plurality of aperture means including a central aperture means through said magnetic means.

a continuous conductor means threaded through said aperture means, said continuous conductor means configured in the form of a segmented toroidal winding a diameter of which extends from one of said parallel surface to a second of said parallel surfaces, said central aperture means being the center of said toroidal winding and perpendicular to said diameter, said toroidal winding producing an incremental increase in magnetic flux within said magnetic means in response to incremental increases in electric current through said conductor.

3. In an electromagnetic induction control means, laminated magnetic means, a plurality of aperture means in said laminated magnetic means disposed to form a segmented toroid, one of said aperture means located along the central axis of said toroid, an electrical conducting means disposed through said central aperture and each of said plurality of apertures and around the outside of said magnetic means in diametrically opposed positions, said conducting means providing a magnetic field of toroidal configuration having minimum field strength at the ouside surfaces of said magnetic means, whereby progressive field strength changes produce continuously variable permeance within said induction control means.

4. In an electromagnetic induction control means, laminated magnetic means, having properties compatible with the magnetic properties of the structure in which the control is utilized, a plurality of aperture means disposed through said magnetic means, said aperture means being shaped to present minimum reduction of the material of said magnetic means, said aperture means being aligned with their centers on a line perpendicular to the outer surfaces of said laminated magnetic means, an electrical conduction means discretely wound through said plurality of aperture means, the minimum number of turns of said conducting means being located between the central-most of said aperture means, windings through succeeding outwardly disposed aperture means being increased in number with the maximum number of windings being at the outer surface of said magnetic means, whereby progressive field strength changes produce continuously variable effectiveness of said induction control means.

5. In an electromagnetic induction control means, laminated magnetic means having magnetic properties compatible with the magnetic properties of the structure in which the control is utilized, a central aperture means disposed through each lamina of said magnetic means, said laminated magnetic means having a first and a second outer lamina, said electrical conducting means wound with a minimum of turns about said first outer lamina through said central aperture means therein, the number of turns on each succeeding lamina adjacent said first outer lamina being continuously increased to a maximum number of turns on said second outer layer, whereby progressive field strength changes produce continuously variable effectiveness of said induction control means.

* * * * *